United States Patent
Baxter

(10) Patent No.: US 9,410,736 B2
(45) Date of Patent: Aug. 9, 2016

(54) SYSTEMS AND METHODS FOR INTEGRATED ENERGY STORAGE AND CRYOGENIC CARBON CAPTURE

(71) Applicant: Larry L. Baxter, Orem, UT (US)

(72) Inventor: Larry L. Baxter, Orem, UT (US)

(73) Assignee: SUSTAINABLE ENERGY SOLUTIONS, LLC, Orem, UT (US)

( * ) Notice: Subject to any disclaimer, the term of this patent is extended or adjusted under 35 U.S.C. 154(b) by 804 days.

(21) Appl. No.: 13/657,616

(22) Filed: Oct. 22, 2012

(65) Prior Publication Data

US 2013/0139543 A1 Jun. 6, 2013

Related U.S. Application Data

(60) Provisional application No. 61/627,998, filed on Oct. 22, 2011.

(51) Int. Cl.

| | | |
|---|---|---|
| F25J 3/00 | (2006.01) | |
| F25J 1/00 | (2006.01) | |
| F01K 1/08 | (2006.01) | |
| F01K 25/10 | (2006.01) | |
| F25J 1/02 | (2006.01) | |
| F25J 3/06 | (2006.01) | |
| F02C 6/14 | (2006.01) | |
| B01D 53/00 | (2006.01) | |

(52) U.S. Cl.
CPC ............. *F25J 1/0022* (2013.01); *B01D 53/002* (2013.01); *F01K 1/08* (2013.01); *F01K 25/10* (2013.01); *F02C 6/14* (2013.01); *F25J 1/0045* (2013.01); *F25J 1/0052* (2013.01); *F25J 1/023* (2013.01); *F25J 1/0208* (2013.01); *F25J 1/0236* (2013.01); *F25J 1/0251* (2013.01); *F25J 3/067* (2013.01); *B01D 2257/504* (2013.01); *F05D 2260/42* (2013.01); *F05D 2260/61* (2013.01); *F25J 2205/20* (2013.01); *F25J 2210/62* (2013.01); *F25J 2210/70* (2013.01); *F25J 2220/80* (2013.01); *F25J 2220/82* (2013.01); *F25J 2220/84* (2013.01); *F25J 2235/80* (2013.01); *F25J 2240/70* (2013.01); *F25J 2240/82* (2013.01); *F25J 2270/42* (2013.01); *F25J 2270/58* (2013.01); *F25J 2270/60* (2013.01); *F25J 2270/904* (2013.01); *F25J 2280/02* (2013.01); *F25J 2290/80* (2013.01); *Y02C 10/12* (2013.01)

(58) Field of Classification Search
CPC ........... F25J 1/0251; F25J 3/067; F25J 1/023; F25J 1/0228; F25J 1/0236; F25J 3/0266; B01D 2257/504; F05D 2260/61; Y02C 10/12; F02C 6/14; F02C 6/18
USPC .......................................... 62/602, 929, 930
See application file for complete search history.

(56) References Cited

U.S. PATENT DOCUMENTS 4,995,234 A * 2/1991 Kooy ...................... F01K 25/10
60/648
6,119,445 A 9/2000 Bronicki et al.
(Continued)

FOREIGN PATENT DOCUMENTS

| DE | 19527882 | 4/1997 |
|---|---|---|
| DE | 102006035273 | 2/2008 |
| JP | 58018504 | 2/1983 |

OTHER PUBLICATIONS

PCT/US2012/061392, Apr. 15, 2013, International Search Report.

*Primary Examiner* — Keith Raymond
(74) *Attorney, Agent, or Firm* — Workman Nydegger

(57) ABSTRACT

The systems and methods integrate energy storage with cryogenic carbon capture, providing effective grid management and energy-efficient carbon capture capabilities to power plants. The systems store energy during off-peak demand by using off-peak energy to compress natural gas to form liquefied natural gas (LNG) and storing the LNG for use as a refrigerant. The systems use the stored LNG as a refrigerant in a cryogenic carbon capture (CCC) process to isolate carbon dioxide from light gases in a flue gas. The systems supply energy during peak demand by burning the natural gas warmed by the CCC process to generate power.

18 Claims, 14 Drawing Sheets

(56) References Cited

U.S. PATENT DOCUMENTS

2008/0302133 A1* 12/2008 Saysset ............... B01D 53/002 62/617

2009/0282840 A1* 11/2009 Chen ..................... F01D 15/005 62/50.3

2009/0301100 A1* 12/2009 Nigro ..................... E21B 43/34 60/780

* cited by examiner

SYSTEMS AND METHODS FOR INTEGRATED ENERGY STORAGE AND CRYOGENIC CARBON CAPTURE

CROSS REFERENCE TO RELATED APPLICATIONS

The present application claims the benefit of U.S. Provisional Patent Application Ser. 61/627,998, filed Oct. 22, 2011, titled "Integrated Carbon Capture and Energy Storage," which is hereby incorporated herein by reference.

BACKGROUND

1. The Field of the Invention

The present invention relates to systems and methods that integrate energy storage and cryogenic carbon capture. More specifically, the invention provides means to store and manage energy generated by power plants or other grid-connected sources and use the stored energy in cryogenic processes to capture carbon dioxide and other condensable vapors from light gases.

2. The Related Technology

The separation of carbon dioxide from other light gases or liquids such as flue gas, nitrogen or methane is important for achieving carbon dioxide sequestration. Process gas (flue gas) from a conventional power station typically includes from about 4% (vol.) to about 16% (vol.) carbon dioxide ($CO_2$) and raw natural gas from a well can include large amounts of $CO_2$. This process technology addresses both these and similar processes containing a condensable, desublimating vapor. This $CO_2$ contributes to greenhouse effect and global warming. Therefore, there is a clear need for efficient methods of capturing $CO_2$ from process gases to produce a concentrated stream of $CO_2$ suitable for transport to a safe storage site or to a further application. Additionally, $CO_2$ in natural gas represents an inert component that is expensive to transport and dilutes the effectiveness of the natural gas. These and similar streams containing a desublimating vapor are addressed by these methods and processes.

$CO_2$ has been captured from gas streams by several technologies, the most common of which include: absorption, where $CO_2$ is selectively absorbed into liquid solvents; oxy-firing, where oxygen is separated from air prior to combustion, producing a substantially pure $CO_2$ effluent; membranes, where $CO_2$ is separated by semi-permeable plastic or ceramic membranes; adsorption, where $CO_2$ is separated by adsorption on the surfaces of specially designed solid particles; chemical looping, where carbon oxidation and oxygen consumption are physically separated by a recycled intermediate, typically metal oxide; and low temperature/high pressure processes, where the separation is achieved by condensing the $CO_2$.

In the past, the most economical technique to capture $CO_2$ from a process gas has been to scrub the process gas with an amine solution to absorb the $CO_2$. This technology has been used commercially for small-scale processes and for specialty processes. For instance, Flour developed a process, called Econamine FG+, for doing so. However, it has not been demonstrated in utility-scale power plants. In all cases, the projected reduction in process efficiency and increase in process costs are high (25-30% and 80%, respectively, according to DOE estimates for power stations).

Another type of process is the oxy-combustion system, which uses oxygen, usually produced in an air separation unit (ASU), instead of air, for the combustion of the primary fuel. The oxygen is often mixed with an inert gas, such as recirculated process gas, to keep the combustion temperature at a suitable level. Oxy-combustion processes produce process gas having $CO_2$, water and $O_2$ as its main constituents; the $CO_2$ concentration being typically greater than about 70% by volume. Treatment of the process gas is often needed to remove air pollutants and non-condensed gases (such as nitrogen) from the process gas before the $CO_2$ is sent to storage.

Cryogenic carbon capture (CCC) processes are emerging new methods for separating $CO_2$ from other gases by condensing $CO_2$. Conventional refrigeration processes are not energy efficient because the processed gases are cooled to a very low temperature, consuming substantial amount of energy in cooling and compressing.

Although Carbon capture and storage (CCS) is highly desirable for controlling carbon output, the energy cost of CCS is high. Capturing and compressing $CO_2$ may increase the fuel needs of a coal-fired CCS plant by 25%-40%. These and other system costs increase the cost of the energy produced by 21-91% for purpose built plants. Applying CCS technology to existing plants would be more expensive if substantial plant modifications or replacement in addition to the CCS technology are required, as is generally the case. Thus, there is a pressing need for energy efficient systems for carbon capturing.

In addition to limiting carbon dioxide emission, the energy industry faces another general challenge: managing energy supply and demand in response to constant fluctuation of energy usage and generation.

Consumption of energy fluctuates with time of the day, week, and season. Many power generation sources cannot practically or economically change generation load according to fluctuation of energy demand. For instance, it would be impractical to idle a nuclear reactor during off-peak hours of the day and re-engage it during peak hours. Coal boilers and all other boiler-style heat engines are similar. As a result, there is great interest in storing energy in excess of demand during non-peak hours and supplying it during peak demand, lest the energy would be wasted.

Moreover, some power generators such as wind turbines and solar farms create intermittent power. The intermittency of such power compromises its effective use since it cannot be accurately anticipated in time or amount and many of the other systems cannot respond to load changes as rapid as wind and solar power changes. This, too, creates a great interest in storing large amounts of grid energy.

Various categories of methods for storing energy include: chemical, biological, electrochemical, electrical, mechanical and thermal. Pumped hydro-storage is among the most reliable and efficient mechanical methods for storing energy, in which electricity is used to pump water into reservoirs during off-peak demand. When demand peaks, the water drives generator turbines. Hydrogen is proposed as a chemical method, where electricity is used to split water molecules to produce hydrogen, which is then burned or reacted in a fuel cell to generate electricity when needed. Compressed air energy storage (CAES) is another mechanical method for storing energy, which uses off-peak power to compress or partially compress air ultimately used in a gas turbine to generate energy.

These methods of energy storage may not be available or economically viable for a specific power plant. For example, pumped storage requires both water and mountains, both of which are highly regulated and often difficult to implement. Hydrogen storage is both very expensive and inefficient and hydrogen storage requires extraordinary materials and processes. CAES requires very large, pressurizable reservoirs to store the compressed air, dictated by the practical availability of aquifers, caverns, or salt domes, etc. for storing compressed air.

Faced with the dual tasks of carbon emission control and energy management, the energy industry can benefit tremendously from systems and methods providing an integrated solution for power management and carbon capture.

BRIEF SUMMARY

The systems and methods described herein integrate energy storage with cryogenic carbon capture (CCC), providing effective grid management and energy-efficient carbon capture capabilities to power plants. The stored energy decreases the parasitic load created by the carbon capture process during peak demand periods. Some stored refrigerants can subsequently be combusted in turbines or other systems to further increase the output of the plant during carbon capture. The CCC process recovers most of this cooling from the cold products to cool the incoming stream, greatly decreasing the required cooling and increasing the process efficiency. CCC also involves desublimating heat exchangers that operate at steady state, avoiding the inefficiencies of cycling temperatures.

The systems and methods according to the current invention use energy during off-peak demand to compress a refrigerant to form a liquid that is stored at low temperature. Materials of interest include but are not limited to natural gas, ethane, propane, and other suitable refrigerants. Most of the following discussion revolves around liquefied natural gas (LNG) as an example, but can also be used with other suitable refrigerants. The LNG forms part of the refrigerant in a cryogenic process that cools a process stream comprising at least one condensable vapor and at least one light gas, causing the condensable vapor to desublimate and separate from the light gas. The example included in the following discussion is separating $CO_2$ from flue gas. While cooling the process stream as the refrigerant, the LNG boils and reverts to a gaseous fuel, which is burned in a gas turbine or other suitable combustor at the end of its cooling cycle to provide energy during peak demand.

The amount of energy storage is determined by the cooling that is done by the stored refrigerant. The power generated by combustion of the refrigerant at the end of its cycle benefits the power plant in that it will be generated during times of peak energy demand, but it is not stored and recovered energy.

In one or more implementations of the invention, the mixed process stream is a flue gas of a fuel-based boiler comprising carbon dioxide, nitrogen, and other components. Such an embodiment provides an integrated solution to energy management and cryogenic carbon capture (CCC) for fuel based power plants.

The CCC processes suitable for implementation of the invention include any CCC process with an external refrigerant that cools a process stream. In a preferred embodiment of the invention, the CCC process is implemented in a retrofit, post-combustion technology that desublimates $CO_2$ in the flue gas of a fuel-based boiler, separates the resulting solid from the remaining light gases, pressurizes the solid $CO_2$, melts the $CO_2$ and warms the light gas, and completes the $CO_2$ pressurization with the liquid $CO_2$.

One aspect of the invention relates to methods for storing electric energy and separating condensable vapors (e.g., $CO_2$) from light gases or liquids (e.g., $N_2$). A method as an embodiment of the invention includes all or a portion of the following steps: (i) liquefying natural gas using electricity or shaft work during off-peak demand; (ii) storing the liquefied natural gas (LNG) in an LNG storage vessel for later use as a refrigerant; (iii) using the LNG as a refrigerant in a desublimating or traditional heat exchanger (DHE), preferably during peak demand of energy, to cool a mixed process stream comprising at least one condensable vapor and at least one light gas, thereby causing the condensable vapor to desublimate and form a solid stream; and (iv) separating the solid stream from the light gas. The processes of separating the solids by this procedure are discussed in Applicant's co-pending U.S. patent application Ser. No. 13/482,980, which is hereby incorporated herein by reference and describes examples of CCC processes that can be applied with the present invention. The discussion below focuses on incorporating energy storage into the CCC process.

In an application of the method, the mixed process steam is a flue gas comprising $CO_2$, $N_2$, and pollutants including mercury, arsenic, cadmium, chromium, nickel, other heavy metals, hydrocarbons, $SO_2$, $NO_2$, HF, and HCl, and other condensable impurities, and the method further comprises condensing and extracting the pollutants at various stages and temperatures during cooling.

A fuel-based boiler may generate the flue gas and provide the energy that drives the liquefaction of the natural gas during off-peak demand. The liquefaction of natural gas may also be powered by the energy of an intermittent energy source during times of low energy demand or high energy output.

To generate energy during peak demand and to eliminate the need for a prohibitively large storage for spent refrigerant, a method according to the invention further comprises burning the natural gas as a spent refrigerant in a gas turbine to generate electricity during peak demand. In one embodiment of the invention, the effluent from the gas turbine enters a boiler yielding the mixed process stream. The effluent contributes to steam generation, providing combined-cycle efficiencies for simple cycle cost. It also provides means to capture the $CO_2$ of the gas turbine effluent.

In another embodiment, flue gas from the boiler supplements air as the turbine feed stream, increasing the $CO_2$ content of the turbine output. The oxygen content of the combined air and flue gas inlet stream must remain sufficient for turbine combustion, with the flue gas acting primarily as a diluent to control turbine inlet temperatures.

In an embodiment of the invention, the LNG may be supplied as the refrigerant in an external cooling loop that runs continuously. The role of this refrigerant is outlined is U.S. patent application Ser. No. 13/482,980. In this embodiment, the warmed refrigerant burns as a fuel to generate energy during peak demand. During off-peak demand, the warmed and un-combusted refrigerant is re-circulated and stored in the low-temperature liquefied fuel vessel, with the energy to condense the refrigerant being supplied by electricity during off peak demand. In this embodiment, natural gas refrigerant provides cooling during both peak and off-peak demands.

In an alternative embodiment of the invention, the LNG is supplied as the refrigerant of a natural gas cooling loop (NGCL) parallel to at least one external cooling loop (ECL). In this process, the ECL provides cooling to the CCC process during off-peak demand, and the NGCL replaces or supplements the external cooling loop during peak demand. The spent natural gas burns in a turbine to generate electricity during peak demand. In this embodiment, possible inefficiencies in the NGCL do not affect the overall process during non-peak demand.

To maximize the heat exchange efficiency, the method boils the LNG, warming it to near ambient temperature, cooling the incoming mixed process stream in one or more upstream heat exchangers (UHE) upstream of the DHE.

Cooling efficiency can be significantly improved by deriving part of the energy used to cool the process stream by warming the cold, separated streams of condensable vapor, light gas and liquid to near ambient temperature in a recuperative heat exchanger. One way to improve cooling efficiency is to use these cold, separated streams to cool the warm, incoming mixed process stream in a self-recuperative heat exchanger (SRHE). Another way to improve cooling efficiency is to use the cold, separated streams to cool the refrigerant on the high temperature end in a recuperative heat exchanger (RHE). To maintain the separated condensable vapor in liquid state as it warms, it is pressurized to 150 bar or other pressure levels suitable for delivery of the condensable vapors for pipeline or mobile transport.

To maximize heat exchange efficiency, it is advantageous to match the temperature profiles of the cooler streams and the warmer streams in heat exchangers. This can be achieved by choosing and combining different refrigerants, staging multiple heat exchangers, controlling flow rates of the streams, adjusting pressures of the refrigerants, and similar process control and refrigeration operations common to the industry. In some embodiments, a relatively small temperature difference exists between the heat exchanging streams, preferably less than 20° C., more preferably less than 5° C., and most preferably less than 1° C.

Energy efficiency can be further improved by bringing the phase change temperatures of the warmer stream and cooler stream into close proximity. The boiling point of the refrigerant may be set to just below the desublimation temperature of the condensable vapor by pressurizing the refrigerant. Preferably, the boiling point of the refrigerant is in the range of 0-20° C. below the lowest desublimation temperature of the condensable vapor. For instance, when LNG is the refrigerant and the condensable vapor is $CO_2$, LNG should be pressurized to about 1-30 bars, so that its boiling point is between about −130° C. and −100° C., being below the sublimation point at 1 atm for $CO_2$ at 15% or less concentration in a light gas.

Alternatively or additionally, to reduce the storage pressure of LNG and save energy spent on pressurizing and especially cooling LNG, LNG may be pressurized to about 2-4 bars.

Another aspect of the invention relates to systems and apparatus for storing energy and separating condensable vapors from light gases or liquids. The system includes a natural gas liquefaction apparatus and an LNG storage vessel configured to store the LNG for later use as a refrigerant. In addition, the system includes at least one desublimating heat exchanger (DHE) comprising: (a) an inlet for a mixed process stream comprising at least one condensable vapor and at least one light gas or liquid, (b) a refrigerant comprising the LNG from the LNG storage vessel, supplied during peak demand, and (c) a heat exchange area configured to allow heat to transfer from the mixed process stream to the refrigerant, thereby causing the condensable vapor in the mixed process stream to desublimate. Moreover, the system includes a solid separator configured to separate the desublimated condensable vapor as a solid stream from the light gas or liquid.

In one or more implementations of the present invention, the system comprises an outer external cooling loop (outer ECL) and an inner external cooling loop (inner ECL). The inner ECL manages heat exchange associated with melting the solid $CO_2$. The outer ECL comprises LNG as a refrigerant, which can provide cooling to the desublimating heat exchanger.

In one embodiment of the invention, the system further comprises a gas turbine configured to burn the spent refrigerant from the outer ECL downstream from the DHE to generate electricity, preferably during peak demand.

Instead of providing the LNG refrigerant in the ECL, an alternative embodiment of the invention provides LNG refrigerant in conduits parallel to an external coolant loop (ECL) to form the desublimating system, where the ECL provides desublimating cooling to the DHE during off-peak demand and cooling load switches to LNG running parallel to the ECL during peak demand.

One or more implementations of the invention integrate the natural gas refrigerant as the only refrigerant in the desublimating ECL, forming a natural gas coolant loop (NGCL) that allows the spent refrigerant downstream from the DHE to recirculate through the natural gas liquefaction apparatus to the LNG storage vessel. Surplus energy is used to liquefy surplus natural gas during low energy demand or high energy output and store the surplus in the LNG storage.

This embodiment further comprises a recuperative heat exchanger (RHE) configured to cool the natural gas by transferring heat from the natural gas to the separated condensable vapor and/or light gas. A liquid pump downstream from the RHE is configured to pressurize the liquid stream to 150 bar or other pressure levels suitable for delivery of the condensable vapors for pipeline or mobile transport.

As a result of the aforementioned and other features, the invention enjoys all or a portion of the following advantages over existing energy storage and condensable vapor separation systems. The systems provides (1) an effective and efficient integrated (coal, natural gas, wind, solar, etc.) energy platform; (2) a means to store energy during off-peak demand and recover this energy during peak power demand, reducing needs for additional generation capacity by load shifting; (3) grid management and energy storage capabilities that enable more effective wind, solar, and other intermittent source management; (4) the ability of a boiler with carbon capture to follow rapid demand changes; (5) supplemental power generation during peak demand by combining LNG and traditional boiler operation; (6) the efficiency advantages of a combined-cycle gas turbine by leveraging the existing boiler; (7) energy-efficient cryogenic carbon capture (CCC) capabilities with reduced or zero peak power demand; and (8) effective CCC for natural-gas-fired turbine power plants.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

I. Introduction

Figure 1:
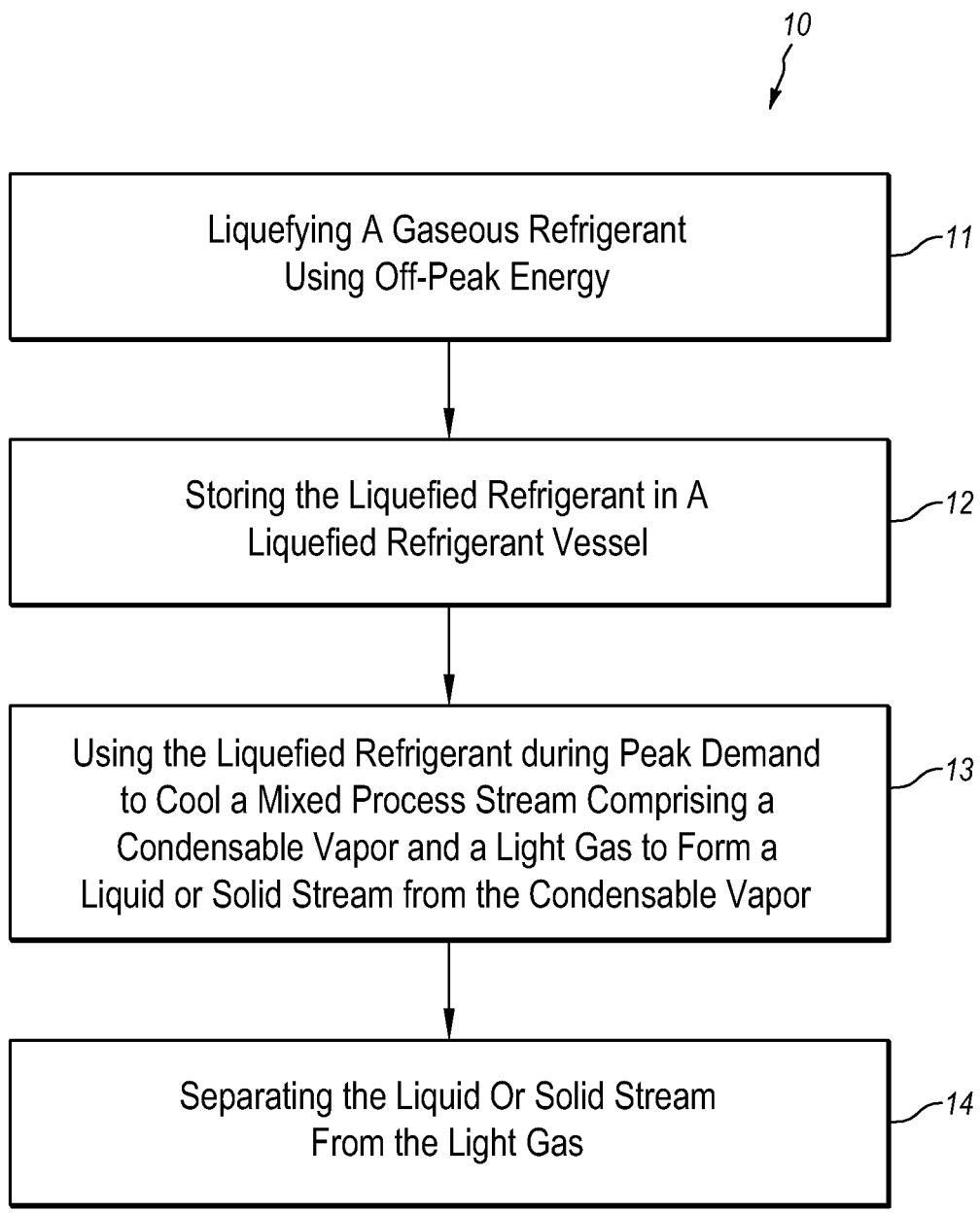
FIG. 1 is a block diagram illustrating the steps of a method for storing energy and cryogenically separating condensable vapors from gases according to one embodiment described herein.

"Peak demand" as used in this document refers to times when energy demand is relatively high, as well as when energy supply is relatively low. In a power system with stable power output, such as a system powered by coal-based power plants, peak demand typically corresponds in hours of high energy demand. In a power system with intermittent power generation, such as a wind or solar power system, peak demand corresponds to times of low energy output, as well as high energy demand. Conversely, "off-peak demand" refers to times when energy demand is relatively low or when energy supply is relatively high.

The terms "peak hours", "peak times" and "peak demand" are used interchangeably herein, unless otherwise specified.

The integrated processes of the invention store energy efficiently and change load rapidly over a significant fraction of the power capacity. The energy storage option can reduce peak load parasitic losses by shifting loads to off-peak or cheaper generation times. The combination of this shift in parasitic load and the additional energy generated by the gas turbine during times when parasitic load is decreased can result in a net power increase during peak demand, in part because of a large decrease in parasitic load and in part because of the increased power generation from the turbine. Only the decrease in parasitic load qualifies as energy storage. However, the increase in generation contributes substantially to grid management and stability. The rapid load change capability provides major grid management capabilities that are essential to accommodate intermittent supplies such as wind and solar energy.

The combined effect of temporarily reducing the parasitic load of the CCC process and of the increased energy output of the gas turbine represent a significant energy storage and grid management mechanism. Refrigerant generation is required in any CCC methods, so the energy involved in refrigerant generation in the current invention offsets the energy saved by its use, providing a nearly 100% efficient energy storage system.

A significant benefit of the invention in addition to energy storage and associated load leveling is rapid response. This provides a coal-fired boiler with the energy storage version of CCC with a capacity to absorb rapidly changing grid dispatch demands driven by intermittent sources such as wind and solar energy or by regular load following. In this way, the coal-fired boiler with CCC becomes a major enabling factor for effective wind and solar energy use. The boiler load changes as the system shifts from storage to production mode, but the change in the boiler load is small compared to the change in boiler power output since most of the change is associated with the change in parasitic loss and the generation of gas turbine power. A relatively small portion of the change comes from the increased boiler portion of the power generation cycle associated with using the turbine flue gas in the boiler, and the boiler need to only adjust to this small change of flue gas flow rate through the boiler. In this embodiment in which the turbine flue gas passes through the boiler, this new process also provides effective capture of $CO_2$ generated from the gas turbine.

Both the current invention and compressed air energy storage (CAES) provide mechanical means to store energy. However, the density of the stored energy in the current invention includes the latent heat of vaporization and sensible heating over a large range. This is much higher than the energy density in compressed air storage.

Liquefying and storing any refrigerant during off-peak demand and using the refrigerant for cooling during peak demand can reduce the parasitic load of conventional CCC processes. However, operating conventional CCC processes on such a schedule requires storing the spent refrigerant at low pressure and high temperature during peak hours, and regenerating it during off-peak hours. The size and cost of the low-pressure/high-temperature storage vessel for such operation might be prohibitively large for any significant amounts of energy storage. One or more implementations of the present invention solves this problem by using natural gas (primarily methane) as the refrigerant, wherein liquefied natural gas (LNG) cools the process stream and boils to form natural gas. A gas turbine combusts the natural gas (methane), providing additional power and eliminating the low-pressure, high-temperature storage problem. Alternative implementations may use alternative refrigerants known in the art, including ethane, propane, and other suitable refrigerants known in the art.

The CCC processes disclosed herein relate to separating condensable vapors from a process stream (e.g., the process gas from a power plant) to form a solid and a separated light-gas stream. The process stream typically comes from a hydrocarbon processing plant, power plant, or sometimes in $CO_2$ sensitive air supplies for life support. Examples of hydrocarbon processing plants and breathing air supply systems that produce a stream suitable for use in the present invention include, but are not limited to coal-fired power plants, natural-gas-fired power plants, fuel-oil-fired power plants, biomass-fired power plants, petrochemical process streams, ambient air in confined or closed spaces such as submarines, natural gas purification streams, syngas or producer gas streams from gasifiers, exhaust from stationary and possibly mobile gasoline, diesel, or similar engines, and black-liquor combustion or gasification effluents.

While the present invention is particularly advantageous for use with process streams from power plants (flue gases), the invention can also be used with other industrial process streams, such as, but not limited to, process streams from petroleum refining, natural gas treatment, and biomass process streams. Most examples of the process stream are given as process gas containing $CO_2$, $N_2$ and impurities, but the invention can be applied to other condensable vapors and light gases or liquids observing the same underlying principles.

The current invention pertains to various CCC processes in general. The invention differs from traditional CCC as it liquefies and stores natural gas as a refrigerant during off peak demand, and uses the refrigerant during peak demand. The integration of heat recovery makes the process far more efficient than it would otherwise be. As a specific illustration, if one wanted to cool room temperature nitrogen to −180° C. and then warm it again with countercurrent heat exchangers, and if one assumes an ideal system (no friction, pressure drop, heat losses, and no temperature driving force required in the heat exchanger), no energy is required to do this once the process is running at steady state. Some energy is required to start the process, but the steady-state condition for this ideal system requires none. As a more realistic scenario, all that is required is to cool the warmer stream by 5-10° C. at the bottom of the cycle. Specifically what is not required is to refrigerate any stream to −180° C. from room temperature, as would be the requirement in a more traditional refrigeration system.

The current invention, when adopted for cryogenic carbon capturing (CCC) of process gas, produces a nearly pure, pressurized $CO_2$ stream and a nearly $CO_2$-free light-gas stream from stationary power process gases. In comparison to oxygen-fired combustion and other well-documented alternatives, the present invention provides improved efficiencies and reduced capital and operating costs. Improved energy efficiencies using the present invention can be achieved through elimination of costly and energy-intensive distillation or comparable purification steps, storage of energy in the form of high-pressure light gases or liquids, and/or reduction of water usage at processing plants.

II. Methods for Separating Condensable Vapors

One aspect of the invention relates to methods for storing electric energy and separating condensable vapors (e.g., $CO_2$) from light gases or liquids (e.g., $N_2$). FIG. 1 provides an overview of an example method according to one embodiment of the invention. The method 10 includes (i) liquefying a gaseous refrigerant using electricity during off-peak demand 11; (ii) storing the liquefied refrigerant in a liquefied refrigerant storage vessel for later use as a refrigerant 12; (iii) using the liquefied refrigerant as a refrigerant in a traditional heat exchanger (THE) or a desublimating heat exchanger (DHE) during peak demand of energy to cool a mixed process stream comprising at least one condensable vapor and at least one light gas, thereby causing the condensable vapor to condense or desublimate and form a liquid or solid stream 13; and (iv) separating the liquid or solid stream from the light gas 14.

Various gaseous refrigerants may be used in the invention as mentioned above. In one or more implementations, the refrigerant is natural gas. In these implementations, at the liquefaction step 11, natural gas is liquefied. Natural gas primarily includes methane ($CH_4$), which can be liquefied by cascade cycle (propane-ethylene-methane cascade) or cooling cycle on a mixed coolant with precooling with propane. Alternatively, a multicomponent mixture of hydrocarbons (methane-ethane-propane-butane-pentane) and nitrogen can be used as the coolant to liquefy natural gas. Moreover, suitable liquefaction methods may be based on gas-distributing stations, throttling-vortex cycle, turbo expansion cycle, throttling-separation cycle with precooling, utilization of liquid nitrogen from metallurgical works, compression-expansion cycle, or other technology established in the art.

At the storage step 12, during peak demand, LNG may be stored in a tank above ground, or a storage underground for later use as a refrigerant in a carbon capture process. In either case, a mechanism to maintain the temperature of the LNG to be lower than its boiling point is desired. LNG may also be compressed to 2 atmospheres as typically applied in LNG storage. However, it may also be compressed either before storage or after storage to increase its pressure so as to control its boiling point to be near the desublimation temperature in the process stream.

A mixed process stream including condensable vapors (e.g., $CO_2$) and a light gas can be provided in step 13 through conduits, pumps, valves, and/or other hardware suitable for delivering a gas from a process plant to a separation unit such as system 400. In some embodiments of the methods, the mixed process stream in the desublimating step 13 is a process gas from a hydrocarbon processing, combustion, gasification, or similar plant. The process stream typically includes $CO_2$, $N_2$, and other components. In such a case, it is advantageous to pre-cool the process stream to ambient temperature and remove the moisture in the mixed process stream (not shown in FIG. 1) before the desublimation step 120. The pre-cooling may be achieved by one or more heat-rejection heat exchangers (HRHEs) using water, air, or cooled process streams.

The LNG refrigerant from the LNG storage is used to cool the mixed process stream in the traditional heat exchanger (THE) or desublimation heat exchanger (DHE), causing the condensable vapor to desublimate and form a liquid or solid stream. As the LNG refrigerant is warmed up, it reverts to NG, which may be used to generate electricity during peak demand.

The desublimation step 13 can be staged by multiple heat exchangers. At various temperatures and stages during the sublimation step 13 and during the precooling by HRHEs, impurities and contaminants, including mercury, arsenic, cadmium, chromium, nickel, other heavy metals, hydrocarbons, $SO_2$, $NO_2$, HF, and HCl, and other condensable impurities can be removed from the mixed process stream. Impurities can be removed by cooling and condensing the impurities and removing the condensed impurities from the mixed process stream prior to desublimating the condensable vapor. In the embodiment for carbon capturing of process gas, most of the impurities are typically condensed at a temperature lower than ambient, but greater than the temperature at which $CO_2$ condenses. The one or more impurities can be removed using a heat exchanger with an integrated condenser and separator that can remove the condensed impurities as a side stream. Examples of impurities that can be removed include, but are not limited to, $SO_2$, $SO_3$, $NO_2$, HCl, HF, Ar, Cr, Ca, Ni, or Hg. The process gas is then cooled by at least one refrigerant to reach a temperature of $T_1$ where the carbon dioxide in the process gas desublimates to form a desublimated $CO_2$ component and a light gas or liquid component. Some residual impurities condense with the $CO_2$ and, if necessary, can be separated from it in later stages.

At step 14, the condensed or desublimated vapor is separated from the light gas to form a liquid or solid stream and a light gas stream. When the mixed process stream is cooled, the desublimated carbon dioxide will accumulate on the surfaces of the vessel or chamber where the condensation is carried out. In one embodiment of the invention, the chamber is configured to allow the solid to be removed from the surfaces of the chamber using mechanical means. The separation techniques of the invention can achieve high removal rates for the carbon dioxide from the process gas. In one embodiment, the present invention removes at least about 95% by weight of carbon dioxide, more preferably at least about 98%, and most preferably at least about 99%.

In one embodiment, the method includes carrying out the condensation in a steady state in which a rate of buildup of desublimated solids is about the same as a rate of removal of desublimated solids. In one embodiment, the removal of condensed vapors is sufficient to allow continuous operation of the system for at least days, weeks, or even months without over accumulating condensed solids in the system.

After separating the solid stream from the light gas in step 14, the separated solid stream is then pressurized to increase its boiling temperature so that the condensable vapor remains in liquid phase when it is warmed back up to ambient temperature. This is advantageous because it costs much less energy to compress the solid phase than the liquid or gas phase of the condensable vapor. By compressing it before warming and evaporating the condensable vapor, substantial compression energy can be saved.

To recover energy spent on cooling the process stream, at least a portion of the solid stream is used to cool the at least one refrigerant that has cooled the mixed process stream at step 13, thereby melting the solid stream to form a liquid stream. Alternatively, the solid stream is used to cool the hot, incoming process stream. This is advantageous because it provides a recuperative means to cool the spent refrigerant natural gas or the hot, incoming process stream, efficiently recovering the energy used in desublimating the condensable vapor.

Similarly, the condensed vapor can be used to cool refrigerants and/or incoming process stream before and after the solid melts. Because the energy absorbed during melting of the solid stream is substantial, it is advantageous to apply the cold process stream to cool the hot process stream or a refrigerant that causes the condensable vapors to desublimate at the first place.

Finally, the warmed liquid stream of the condensable vapor can be further compressed to a temperature suitable for delivery or sequestering.

The method can be carried out using compression and expansion equipment commonly found in cryogenic cooling cycles. One benefit of some of the processes described herein is that they can be carried out with little or no modifications to the upstream process (e.g., coal fired power plant), which allows the systems and methods to be built at full scale as bolt-on systems.

Figure 3:
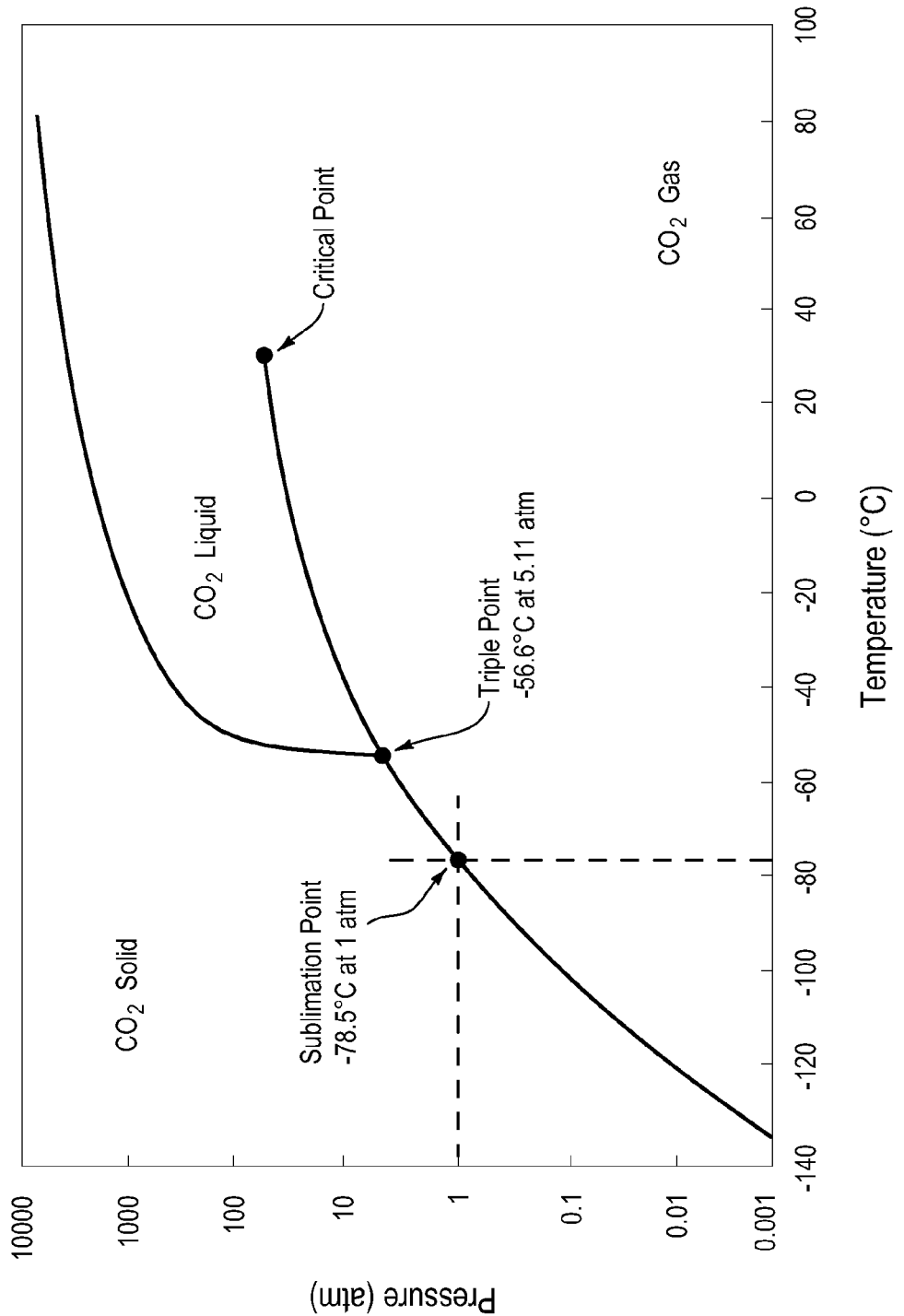
FIG. 3 is a phase diagram for pure carbon dioxide.

Based on the empirical temperature profile of the process gas, further improvements of heat exchange efficiency can be achieved by matching the refrigerant's boiling temperature to $CO_2$ desublimating temperature to maximize efficiency of heat exchange during cooling of the $CO_2$. In a preferred embodiment, the method includes vaporizing at least a portion of the one or more refrigerants in a temperature range of 0-20° C. below the $CO_2$ desublimating temperature, which is −78.5° C. at 1 atm, as shown in the pressure-temperature phase diagram for $CO_2$ of FIG. 3.

In one embodiment, to match the temperature profile of the LNG refrigerant with that of $CO_2$, the LNG is pressurized so it boils in a temperature range of 0-20° C. below the lowest desublimating temperature of $CO_2$. Implementations of the invention adjust the temperature profiles of the refrigerants based on the concentration of $CO_2$ because the concentration affects the condensation and desublimation points of the process stream.

Figure 2:
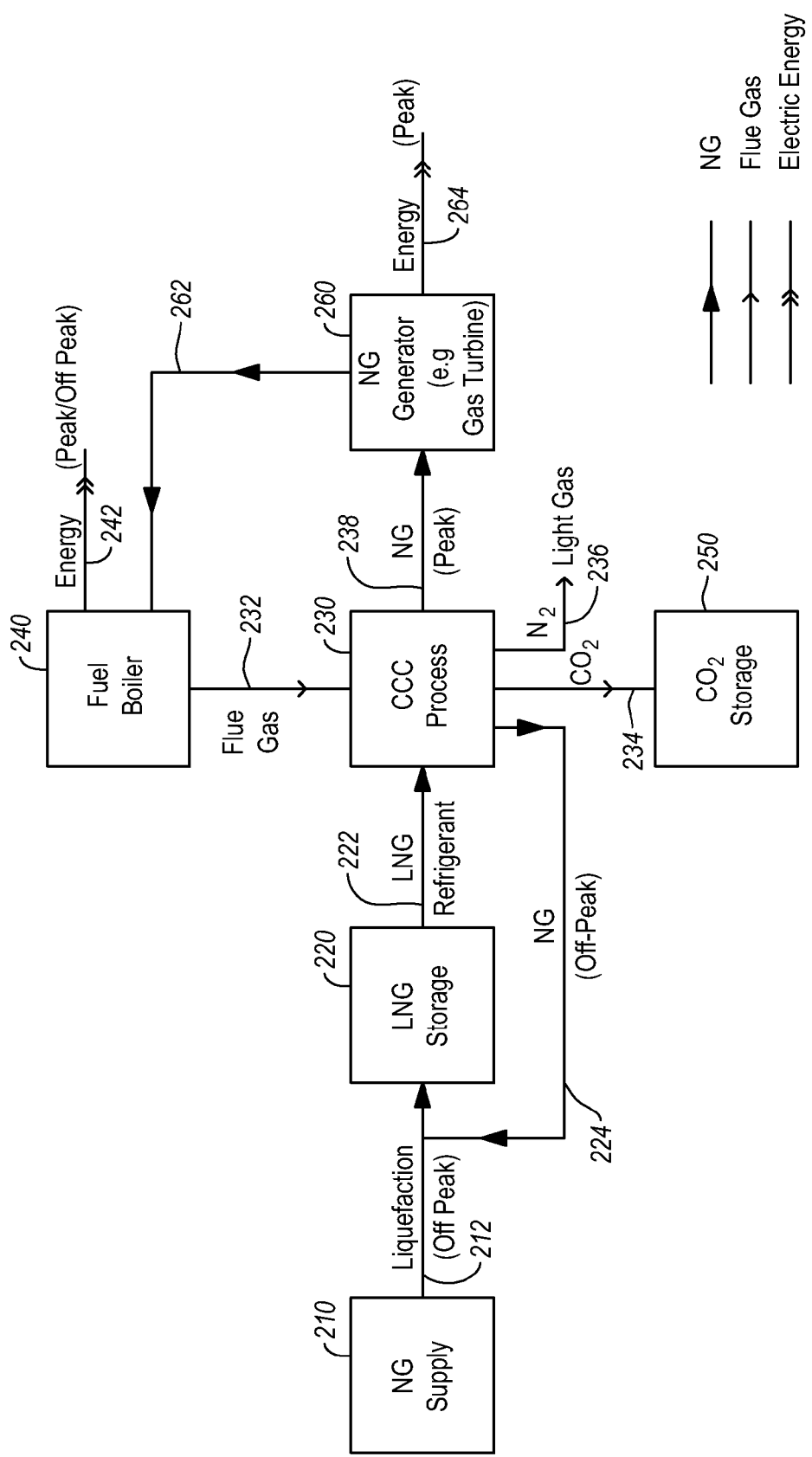
FIG. 2 is a schematic diagram illustrating the main components and steps involved in storing energy and capturing carbon dioxide in flue gas according to one embodiment of the invention described herein.

One embodiment of the invention is a method that integrates energy storage with CCC. FIG. 2 illustrates the main components and steps involved in storing energy and capturing carbon dioxide in flue gas according to one embodiment of the invention described herein embodiment of the invention is a method that integrates energy storage with CCC. In this embodiment, the natural gas supply 210 provides for a source of refrigerant to be used in a CCC process, which is liquefied using electricity during off-peak demand 212. The liquefied natural gas is stored in an LNG storage vessel 220 during off-peak demand and provided as a refrigerant in the CCC process during peak demand.

In one embodiment the LNG refrigerant is recirculated to the LNG storage vessel 220 during off-peak demand. In this embodiment, LNG may be supplied as a refrigerant 222 during both peak and off-peak demands. In the CCC process, the LNG refrigerant cools a flue gas 232 from a fuel-based boiler 240, causing the $CO_2$ to desublimate and form a solid $CO_2$ stream 234, which can be separated from light gas $N_2$ 236 and pollutants. The $CO_2$ may then be sequestered and stored in liquid form in tanks, aquifers, caverns, or other suitable storage means 250. The spent refrigerant after the CCC process boils and reverts from LNG to NG. To provide energy during peak hours, the NG 238 is fed to an NG-based generator 260, e.g., a gas turbine, to generate electricity during peak demand 264.

In one embodiment of the invention, the effluent 262 from the gas turbine 260 enters the fuel-based boiler 240 yielding the fuel gas 323. The effluent 262 contributes to steam generation, providing combined-cycle efficiencies for simple cycle cost. It also provides means to capture the $CO_2$ of the gas turbine effluent 262.

III. System for Separating Condensable Vapors

A. System Configuration

Figure 4:
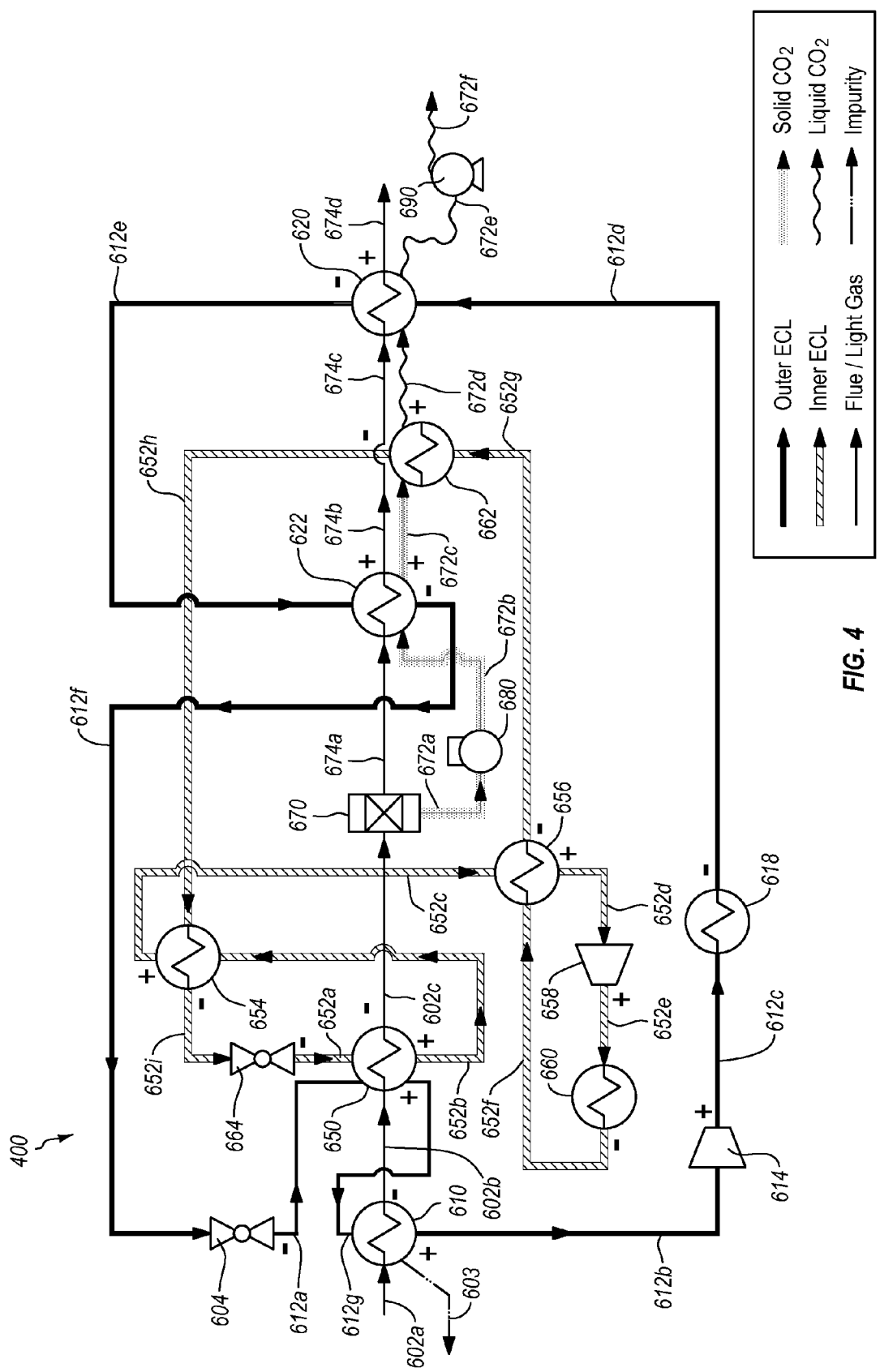
FIG. 4 is a flow diagram of a system for cryogenically separating condensable vapors from gases, the system having one external cooling loop (ECL), a desublimating heat exchanger (DHE) and a recuperative heat exchanger (RHE)

FIG. 4 is a flow diagram of a cryogenic separation system 400 that may be retrofitted to implement a system for energy storage and CCC. The CCC system has an inner external cooling loop (ECL) and an outer ECL. In this double ECL system, cooling of the mixed process streams are staged in a gas refrigerant heat exchanger (GHE) 610 and a desublimating gas refrigerant heat exchanger D-GHE 650, while cooling of the refrigerants are staged through various heat exchangers in the outer ECL and the inner ECL.

System 400 includes a source for a mixed process stream 602a comprising at least one condensable vapor (e.g., $CO_2$) and at least one light gas or liquid (e.g., $N_2$ or $CH_4$). The ECLs are configured in a manner so that the inner ECL both cools the mixed process stream 602b causing it to desublimate, and warms the separated process streams causing the solid stream to melt, while the outer ECL provides cooling and recovery that complement the inner ECL.

In this and subsequent process flow diagrams, the temperature and process changes in the streams appear in separate heat exchangers. In practice, many of these heat exchangers and other process elements can be combined to improve efficiency and reduce overall footprint. Specifically, most of the compressors would preferably be combined with their down-stream heat exchangers to form a multi-stage compressor with inter-stage cooling. Also, many of the heat exchangers can be combined into multi-stream, single unit or staged unit designs that provide more efficient operation and control.

The system 400 is drawn with a single GHE 610 and a single D-GHE 650 for the process gas cooling stage. In practice, several heat exchangers of differing size and design would be used to accommodate changes in process gas density and different heat exchanger mechanism. In particular, several heat exchangers in this process involve phase changes (desublimation, melting, refrigerant condensation, and refrigerant boiling) and associated differences in design. Normal sensible heat systems are widely available in the industry. Desublimating systems are subjects of other patents by this organization and are described in detail in them.

The system preserves energy by cyclically warming and cooling ECL refrigerant stream in various heat exchanges, thereby cooling the mixed process stream and recuperating the energy spent on the cooling. In the flow diagrams of FIGS. 4-6 and 8-9 illustrating heat exchangers, a "+" sign on an output end of a heat exchanger stream indicates that the temperature of the stream rises as a result of heat exchange, and a "−" indicates that the temperature of the stream decreases.

In an embodiment of the invention, the at least one refrigerant comprises $CF_4$, ethane, nitrogen, argon, methane, established commercial refrigerants, Montreal-protocol-compliant refrigerants, or any combinations of these.

The inner ECL of system 400 has two supplementary gas heat exchangers 654 and 656 (S-GHE) that uses the residual cooling power of the gas phase refrigerant streams 652b and 652c to cool the warmer streams of the same refrigerant 652h and 652f, respectively. In this embodiment, the inner ECL comprises a first S-GHE 654 immediately upstream from an expansion device 664 and immediately downstream from the D-GHE 650, which is configured to cool the condensed-phase inner-ECL refrigerant stream 652h by warming the gas-phase inner-ECL refrigerant stream 652b. Similarly, the inner ECL also can include a second S-GHE 656 downstream from the first S-GHE 654 and upstream from a compressor 658, which is configured to use the uncompressed gaseous inner-ECL refrigerant stream 652c to cool the compressed gaseous inner-ECL refrigerant stream 652f.

In an embodiment of the system as implemented in FIG. 4, at least a portion of the inner-ECL refrigerant is configured to evaporate at a lower pressure in a temperature range of 0-20° C. below the desublimating temperature of the condensable vapor and condense at a higher pressure in a temperature range of 0-20° C. above the melting temperature of the solid stream. More preferably, these temperature ranges are 0-5° C., and most preferably, 0-1° C.

The inner ECL of system 400 comprises a recuperative melting heat exchanger 662 (R-MHE) that cools the refrigerant stream 652g using the cooled and separated solid stream 672c, yielding a condensed phase refrigerant stream 652h with a lower entropy than 652g. The refrigerant stream 652h is further cooled in the cooled by the gas-phase inner-ECL refrigerant stream 652b at the S-GHE 654, then the refrigerant 652i is expanded by the expansion device 664, resulting in decreased pressure and temperature, starting a new cycle of the inner ECL.

In the outer ECL as implemented in the system 400 shown in FIG. 4, an expansion device 604 first reduces the pressure of the outer ECL liquid refrigerant stream 612f, causing the refrigerant to boil and evaporate, producing a cold, low pressure refrigerant stream 612a. The boiling of stream 612a can occur at the outlet of expansion vale 604 or within heat exchanger 650. Although the expansion device 604 is illustrated as separate from the GHE 610 in FIG. 4, in practice the devices can be thermally coupled to allow heat to transfer from the mixed process stream 602a to the refrigerant during the evaporation of the refrigerant. Stream 612a is introduced into DGHE 650 where it absorbs heat from process stream 602b and causes desublimation of process stream 602b (alone or in combination with the inner ECL refrigerant 652a).

Stream 612a exits D-GHE 650 as gaseous stream 612g, which enters gaseous refrigerant heat exchanger (GHE) 610, cooling the condensable vapor of stream 602a to a temperature T1, yielding a cooled mixed process stream 602b. At this cooling stage, impurities 603 may be removed from the GHE 610. In practice, some pollutants propagate through the system to be collected with the $CO_2$ either as fugitive particles and vapors or because they do not completely condense prior to the $CO_2$ removal stage. Therefore, not all impurities will exit the system in stream 603, though many of them will.

The separation of impurities is carried out by selecting a proper temperature and pressure at which the impurity will condense and the other condensable vapors (e.g., $CO_2$) do not condense. Those skilled in the art are familiar with the temperatures and pressures needed to condense impurities typically found in a process stream. These impurities include but are not limited to oxides of sulfur and nitrogen ($SO_2$, $SO_3$, NO, $NO_2$), water at sub-freezing temperatures, halogenated gases (HCl, HgClx), mercury, arsenic compounds, cadmium, chromium, nickel, other heavy metals, and other impurities common to process gases and of operational, health, or environmental concern. Generally, these compounds desublimate or condense when temperatures of particles or surfaces are at or below the frost or dew points of these compounds. The actual desublimation and freezing points of these compounds when they exist as components of a mixture depend strongly on the mixture composition in ways that are complex, but well known to one skilled in the art of mixture thermodynamics.

The gaseous refrigerant stream 612g exits GHE 610 as stream 612b. Stream 612b is then compressed by a compressor 614, which decreases the volume, increases the pressure and temperature of the gas, while maintaining the same entropy for stream 612c relative to stream 612b. The heat generated from the compression is transferred from the gaseous refrigerant stream 612c to an ambient coolant (e.g., water) in a heat-rejection heat exchanger (HRHE) 618, forming a cooler gaseous refrigerant stream 612d. Then a recuperative liquid-gas heat exchanger (R-LGHE) 620 cools the gaseous refrigerant stream 612d using the liquid stream 672d and the light gas or liquid stream 674c. Next a recuperative solid-gas heat exchanger (R-SGHE) 622 further cools the refrigerant stream 612e using the solid stream 672b and the light gas or liquid stream 674a. In a preferred embodiment, the cooling by the R-LGHE 620 and R-SGHE 622 reduces the entropy of the refrigerant sufficiently to yield a condensed phase refrigerant stream 612f. The condensed phase refrigerant stream 612f is then expanded by the expansion device 624 again, resulting in decreased pressure and temperature, starting a new cycle of the outer ECL.

At various stages and temperature during cooling of the mixed process stream, one or more impurities can be removed as a side stream 603. The system illustrated in FIG. 4 also comprises a solids separator 670 that separates the desublimated condensable vapor (e.g., $CO_2$) from the light gas or liquid (e.g., $N_2$), forming a solid stream 672a and a light gas or liquid stream 674a. A solids compressor 680 downstream from the solids separator 670 and upstream from the R-SGHE 622 is configured to pressurize the solid stream 672a, so that the condensable vapor remains in liquid phase 672e when it is warmed back up to ambient temperature. Finally the liquid stream of the condensable vapor can then be further compressed by a liquid pump 690, forming a compressed liquid stream 672f ready to be delivered or sequestered.

Figure 5:
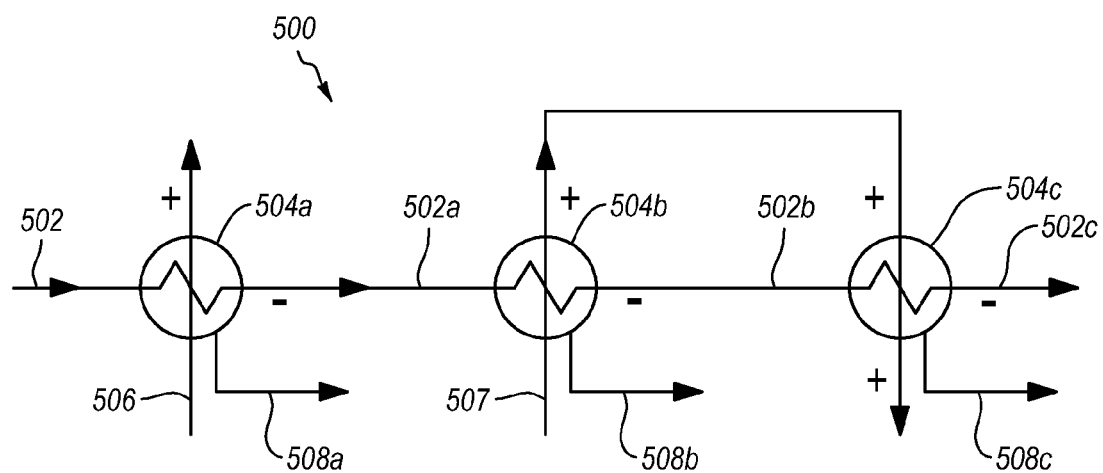
FIG. 5 is a schematic diagram of an upstream heat exchanger (UHE) unit for cooling a mixed process stream upstream of a desublimating heat exchanger (DHE)

The invention can be advantageously practiced by preprocessing the mixed process stream with an UHE 500 to cool the mixed process stream to a temperature near the temperature of the refrigerant in GHE 610 and D-GHE 650. FIG. 5 provides an illustrative example of an upstream heat exchanger (UHE) 500 that can pre-process the mixed process stream, which can include any number of compressors, heat exchangers, fans, pumps, conduits, valves, sensors, controllers, and other components known in the art for cooling, drying, pressurizing, and/or purifying a process stream. The configuration shown in FIG. 5 can be staged any number of times to provide efficient removal of impurities over a range of temperatures, with such staging occurring preferably such that all heat exchange occurs countercurrently or optionally with some or all heat exchanger occurring cross currently or co-currently.

As shown in FIG. 5, an UHE unit 500 includes a plurality of heat exchangers 504a-c. The mixed process stream 502 is first typically cooled to ambient temperatures using water and/or air in one or more cooling processes. For example, water 506 can be used to cool process stream 502 using a first heat exchanger 504a to produce a process stream 502a at ambient temperature. In a second heat exchanger 504b, the mixed process stream 502a is cooled in the second heat exchanger 504b to condense any water vapors that may exists in process stream 502a to produce a dry process stream 502b. A dry stream may also be produced using absorbing beds rather than thermal condensing heat exchangers, as are common in the industry. The process stream 502a can be cooled using any suitable coolant 507. Coolant 507 can be provided from any portion of cooled light gas or liquid stream 674 or condensable vapor liquid stream 672 or provided by non-recuperative techniques known in the art, such as, but not limited to an external refrigeration unit, a salt-solution technique, or a staged cooling technique. A third heat exchanger 504c may be coupled to the second heat exchanger 504b to stage the heat exchange between the process stream 502 and the cooling stream 507. The heat exchangers 504a-c can include a separator for removing condensed water 508a-c. Residual water may be removed using absorption, salt solution, pressurization, or other techniques known in the art.

UHE 500 can also be configured to remove one or more different types of impurities. Impurities are often found in the process streams as a consequence of using natural products such as coal and petroleum to produce the process stream. In one embodiment, the process stream can include, but is not limited to, mercury, NOx, SOx, HCl, residual moisture, combinations of these, and any other impurities known to be present in industrial process streams. In one embodiment, the impurities can be removed from the heat exchangers 504a-c as impurity streams 508a-c.

Turning now to FIG. 6, FIG. 6A-C illustrate the gist of three operational stages of an integrated CCC and energy storage system. FIG. 6D-F illustrate an integrated system 600 implemented by retrofitting a CCC system 400 shown in FIG. 4 according to the principles of this invention and consistent with the gist shown in FIG. 6A-C.

Figure 6A:
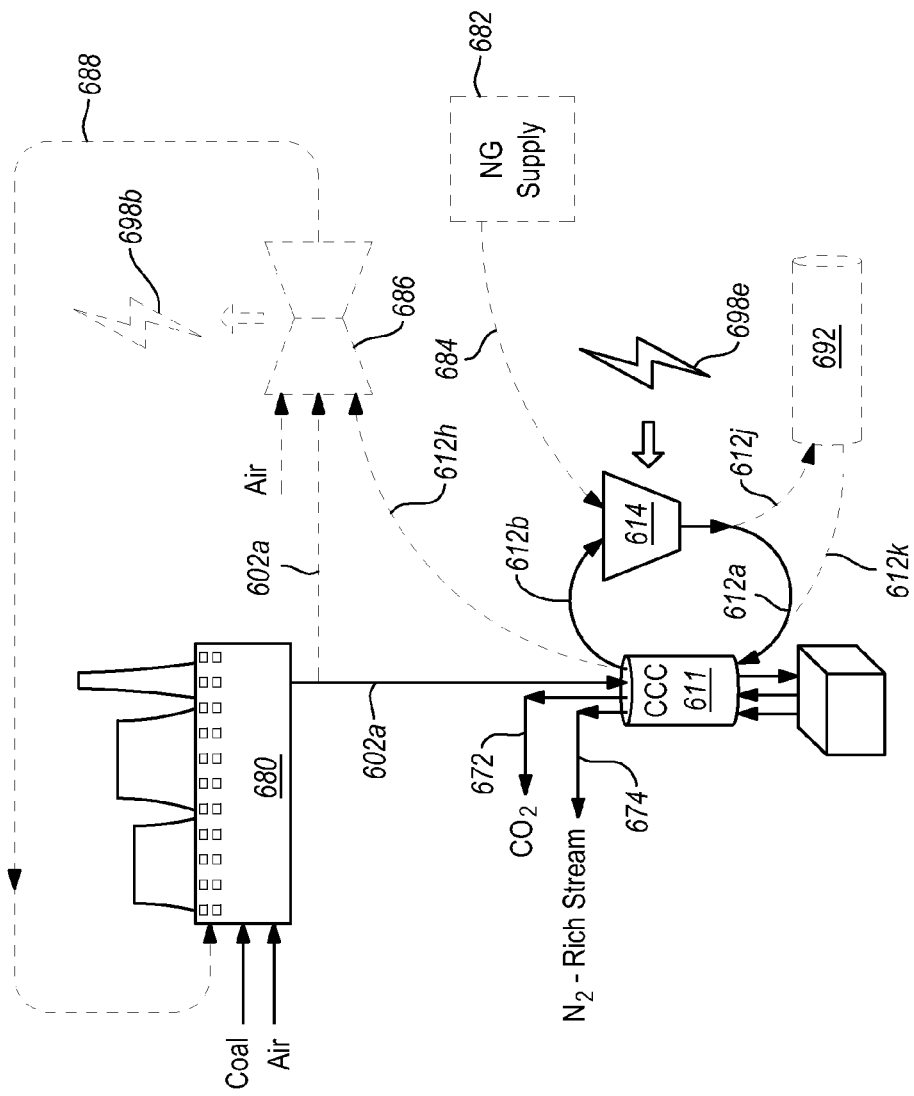
FIGS. 6A-6F illustrate a system with grid energy storage and cryogenic carbon capture capabilities, the system having a natural gas cooling loop (NGCL), a desublimating heat exchanger (DHE) and a recuperative heat exchanger (RHE)

FIG. 6A illustrates the main components of an integrated CCC and energy storage system during normal operation mode where the energy storage components are inactive. The CCC components comprise a coal boiler 680, a CCC heat exchange subsystem 611, and a compressor 614. The compressor 614 compresses a spent refrigerant 612b from the CCC heat exchange subsystem 611, and returns the regenerated refrigerant 612a to the CCC heat exchange subsystem 611. The energy needed for the refrigeration is indicated by the symbol 698e. The CCC heat exchange subsystem 611 processes flue gas 602a from the boiler 680, separating a $CO_2$ stream 672 from an $N_2$ rich stream 674 and sequestering the $CO_2$ stream 672.

The CCC components are essentially the same as those of general CCC systems. In this integrated CCC and energy storage system, the CCC components are connected to a natural gas supply 682, an LNG storage vessel 692, and a natural gas turbine 686, which are inactive during the normal operation mode of the system. The dashed lines in FIG. 6 indicates existing and inactive components and connections among components.

Figure 6B:
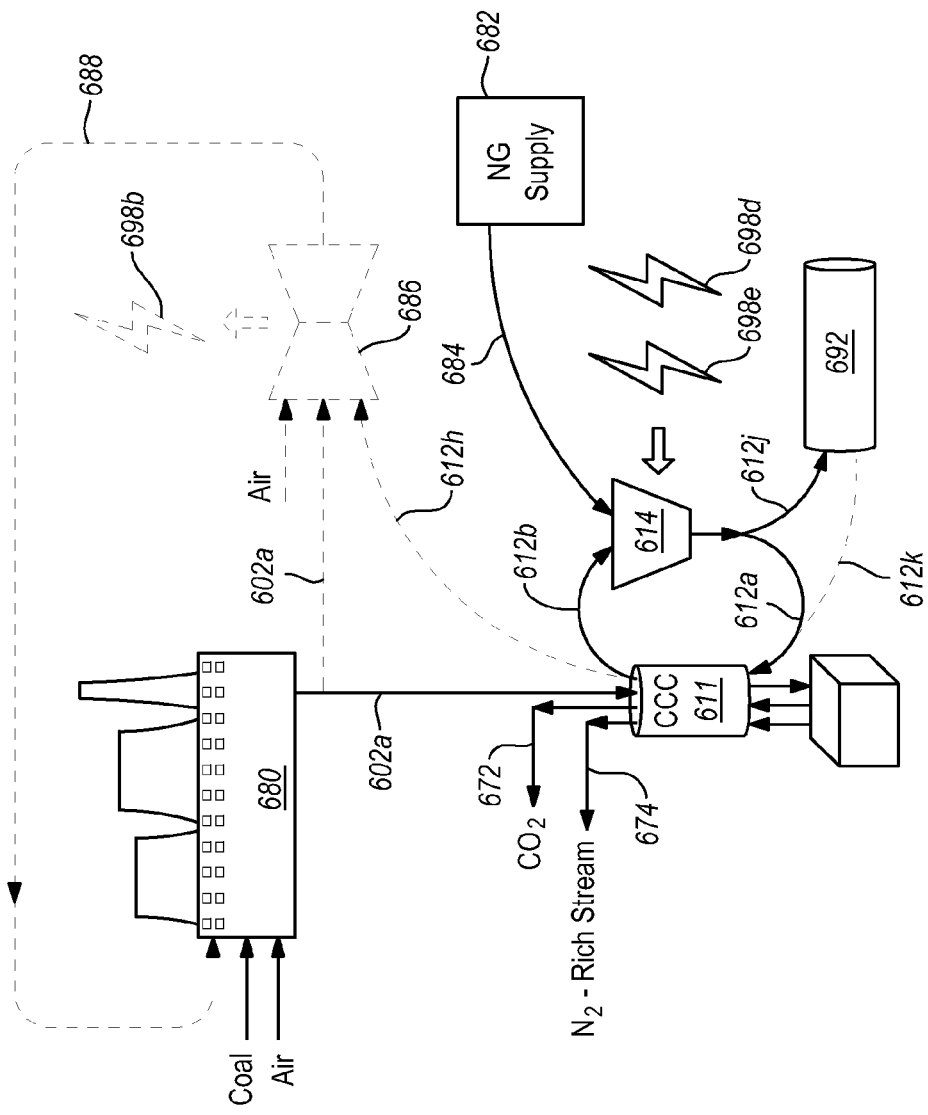

FIG. 6B shows that during off-peak, energy storing mode, the integrated CCC and energy storage system activates the natural gas supply 682 and the LNG storage vessel 692 by drawing natural gas 684 to the compressor 614, which liquefies the natural gas and stores the LNG 612j in the LNG storage vessel 692. Compressing the natural gas and storing the LNG provides a mechanism to store energy during off-peak hours. When compressing and storing natural gas, the integrated system simultaneously compresses spent refrigerant 612b and provides regenerated refrigerant 612a to the CCC subsystem 611. The symbol 698d indicates the energy used to compress the natural gas in addition to the energy for refrigeration as indicated by the symbol 698e.

Figure 6C:
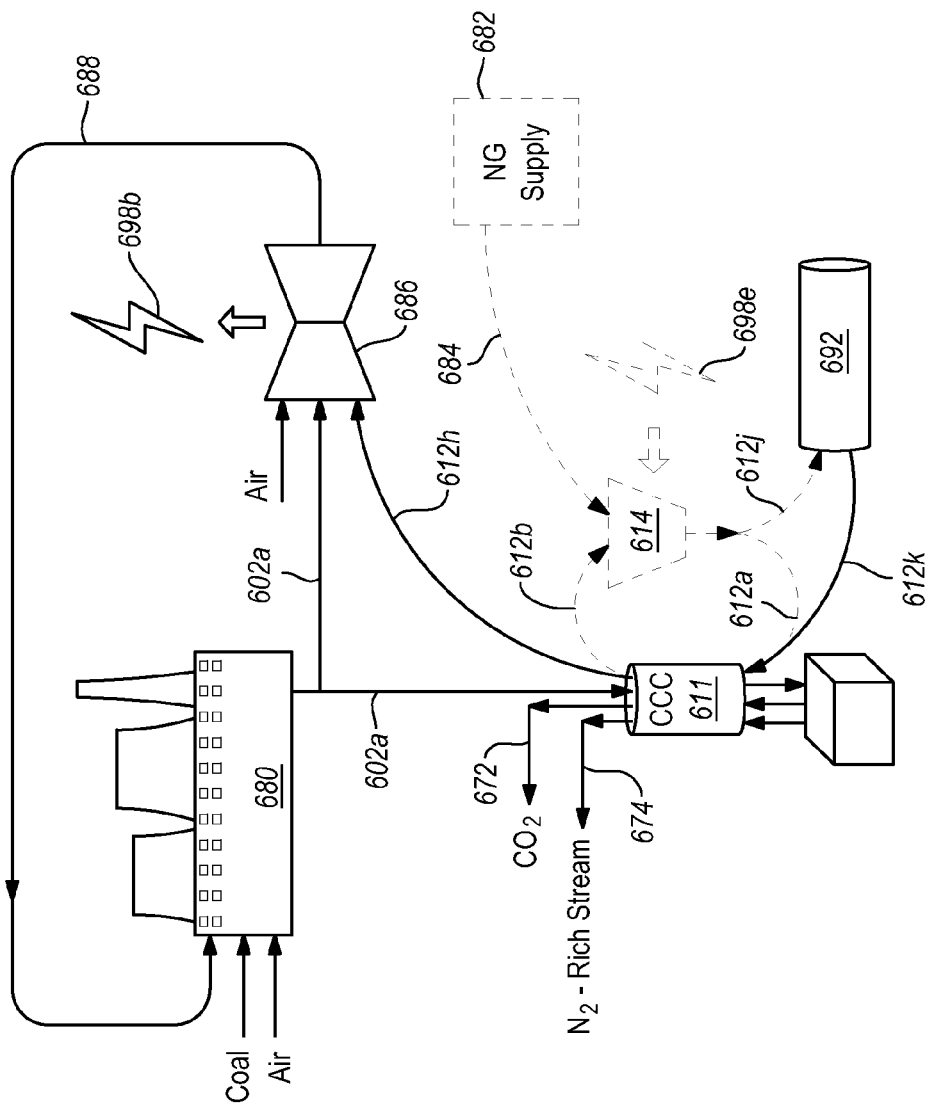

FIG. 6C shows that during peak, energy recovery mode, the compressor 614 stops doing work, and LNG 612k from the LNG storage unit 692 provides cooling to the CCC subsystem. This reduces the parasitic load of the CCC process during peak hours. Meanwhile, natural gas 612h as a spent refrigerant provides fuel to a gas turbine 686 to generate electricity 698b. In one or more implementations of the present invention, a turbine inlet stream may comprise $CO_2$-laden boiler flue gas 602a, increasing the $CO_2$ content of the turbine outlet compared to that when air alone is used. In one more implementations, the effluent of the gas turbine 688 passes into the coal boiler 680, providing combined-cycle efficiencies for simple cycle cost. It also provides means to capture the $CO_2$ of the gas turbine effluent.

Figure 6D:
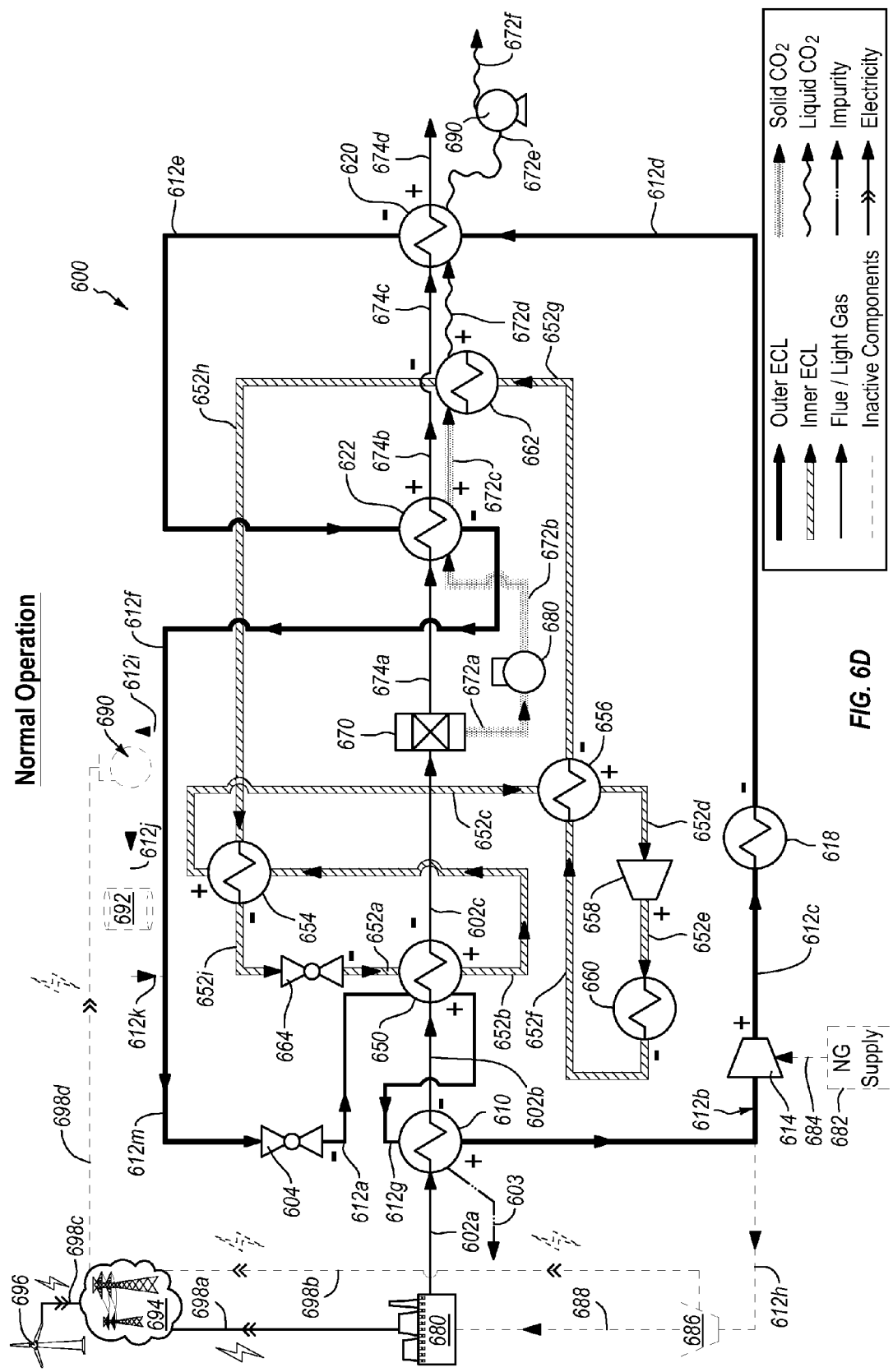
Figure 6E:
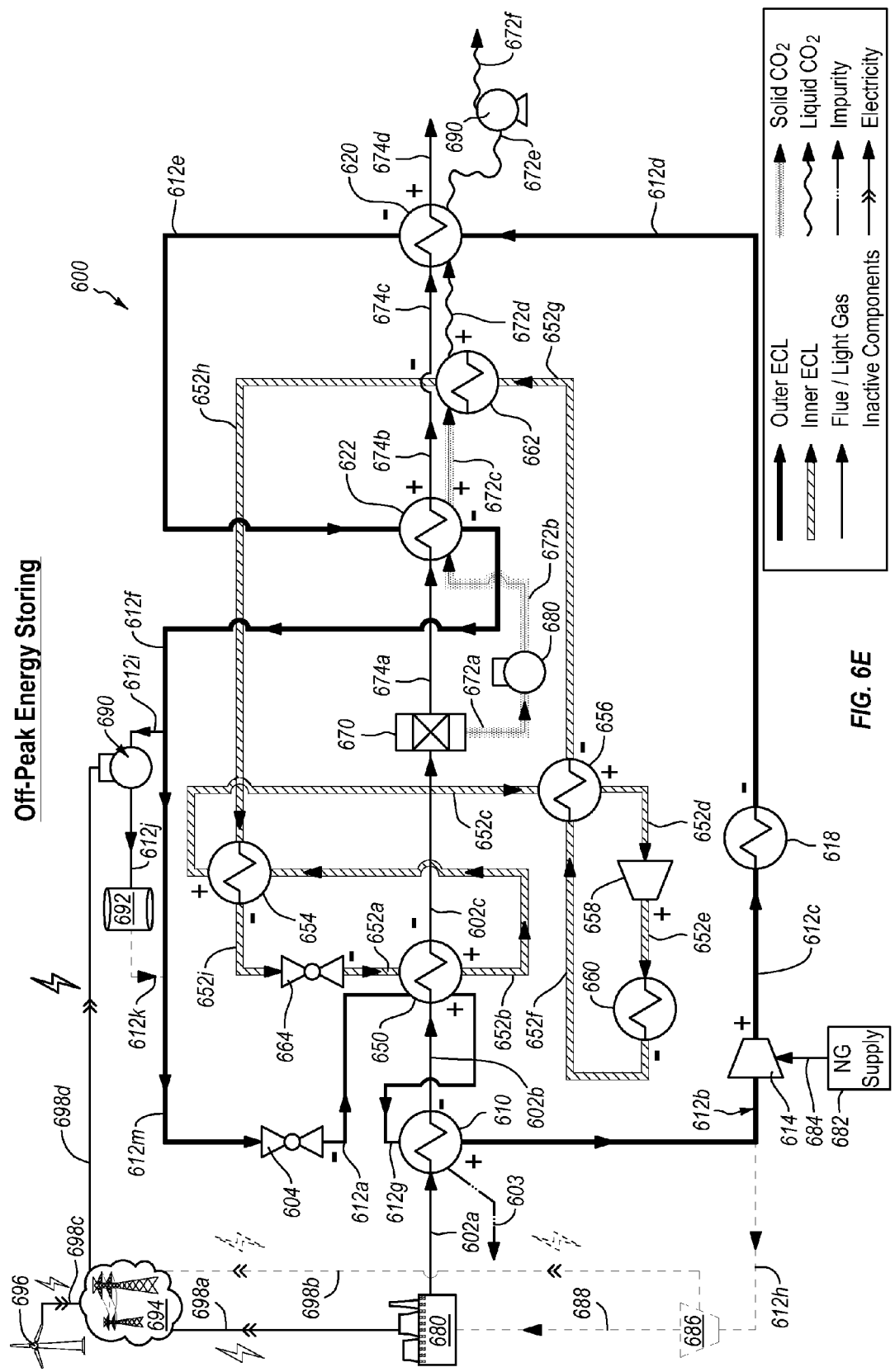

The integrated CCC and energy storage system 600 shown in FIG. 6D-E provides grid energy management capability and CCC function. In this system, the CCC components are based on the two-ECL-loop system 400 shown in FIG. 4, and the LNG components are integrated with the CCC components in a theme similar to that of FIG. 5A-C. The flue gas 602a is an effluent of a fuel based power plant 680, and the outer refrigerant loop for the CCC process is replaced by a natural gas refrigerant loop. The CCC subsystem are connected to a natural gas supply 682, a natural gas liquefaction device 690, a LNG storage vessel 692, and a gas turbine 686. The integrated system 600 is connected to an electric grid 694 that supplies energy to the system. The integrated system 600 stores surplus energy from the energy grid 694 by compressing and storing natural gas during off-peak hours. During peak hours, the integrated system 600 supplies LNG, which provides or supplements cooling to the CCC process. The integrated system 600 can also generate electricity using a gas turbine 686 burning the spent refrigerant natural gas 612h.

The inner ECL of the integrated system 600 functions similarly as the system 400. The outer ECL comprises an LNG refrigerant and operates differently under different modes. During the normal operation mode as shown in FIG. 6D, an energy grid 696 provides energy for the refrigeration of the CCC subsystem, and the natural gas components are inactive. The energy grid 694 receives energy from various sources, such as receiving electricity 698a from the coal power plant 680 and electricity 698c from a wind power plant 696. Under normal operation mode, the outer ECL of the integrated system 600 operates essentially in the same manner as in the two-ECL-loop system 400.

During the off-peak, energy storing mode as shown in FIG. 6E, the outer ECL of the integrated system 600 draws natural gas 684 from a natural gas supply 682, and uses surplus electricity 698d to power the liquefaction device 690, which liquefies natural gas 612i. The LNG 612j produced by the liquefaction device 690 is stored in a LNG storage vessel 692 for use as refrigerant when energy demand is high. The integrated system 600 also simultaneously regenerates and recirculates a NG refrigerant that provides cooling to the CCC process. This provides an energy storage mechanism to the energy grid 694.

Figure 6F:
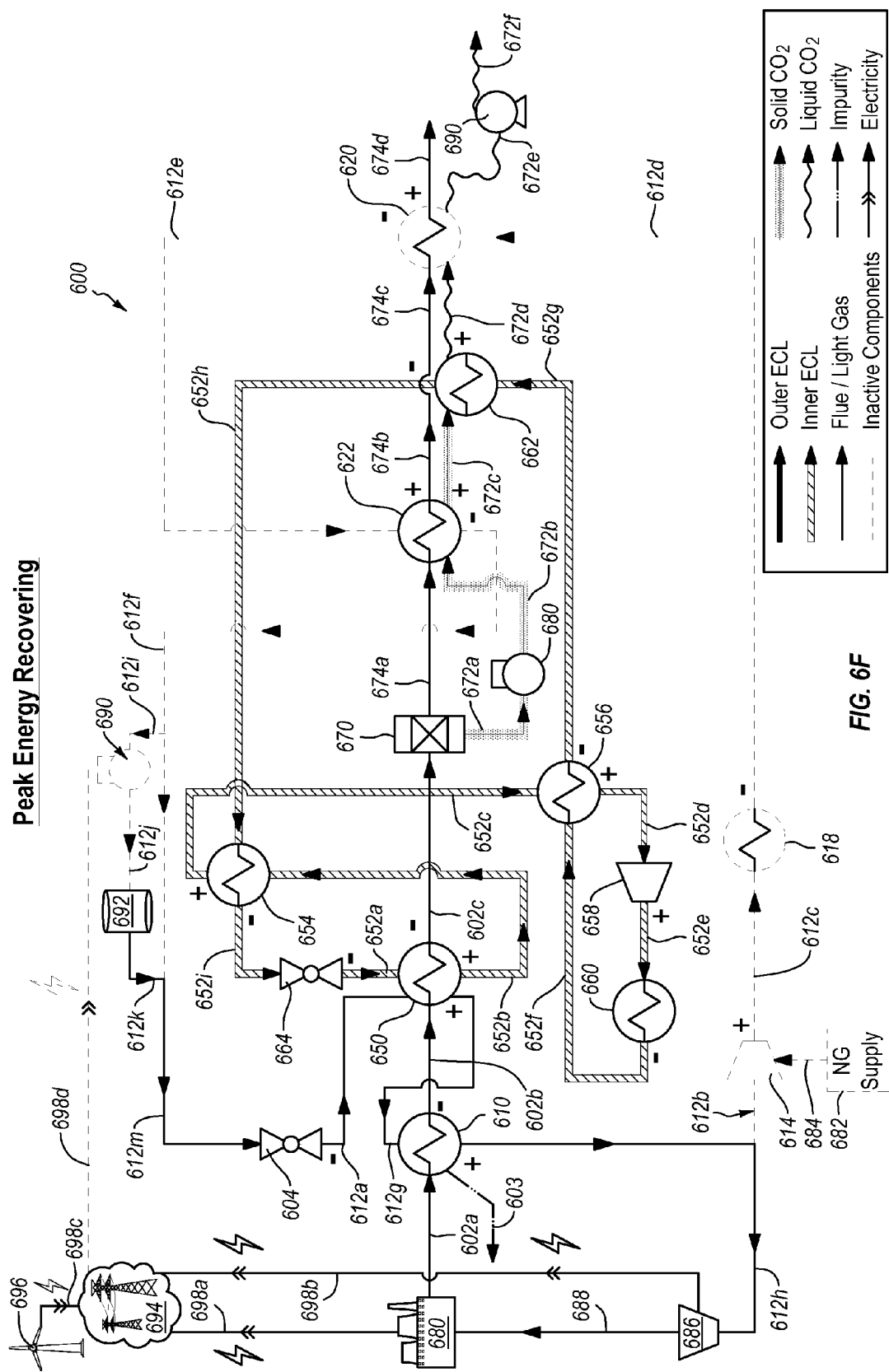
Figure 7:
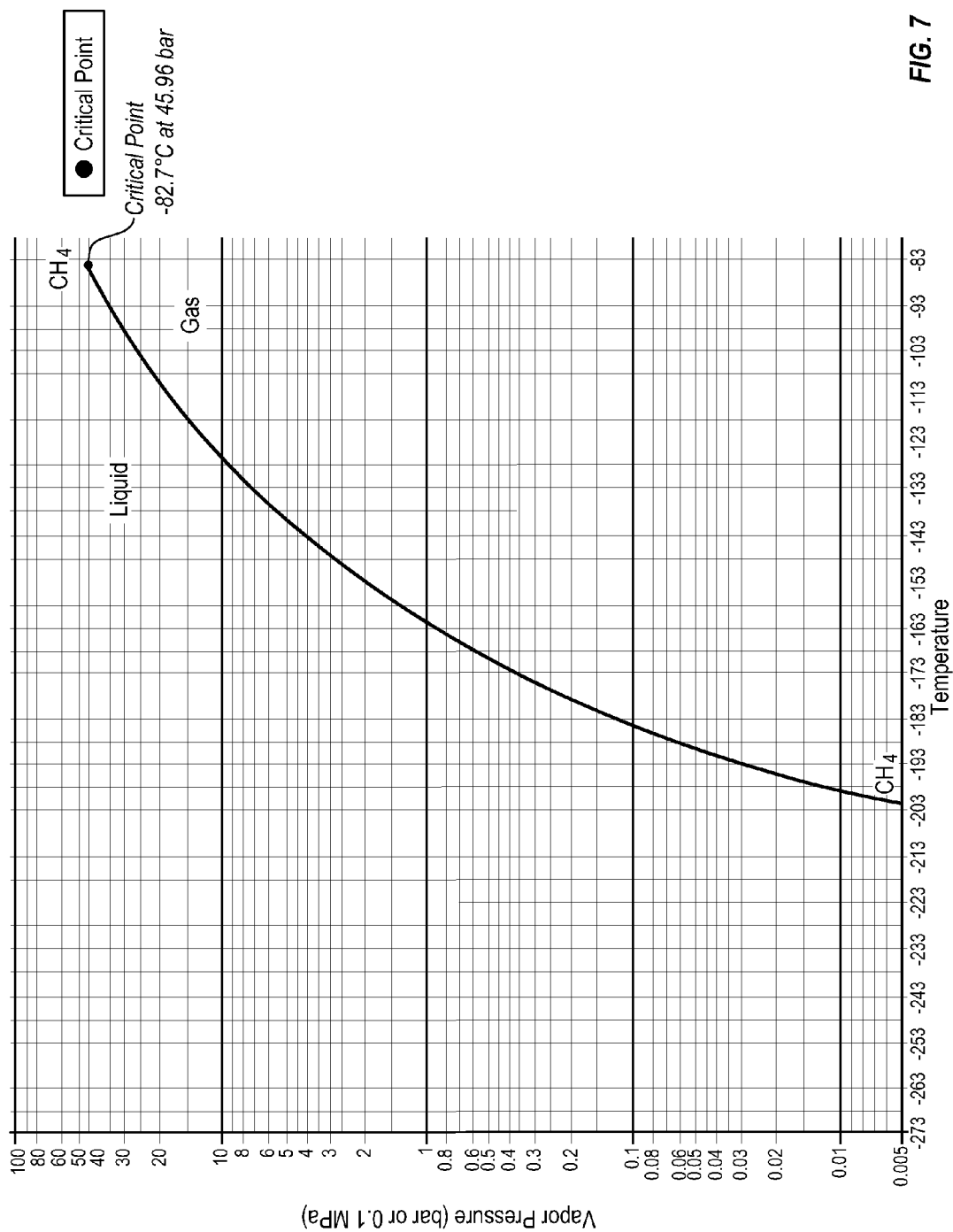
FIG. 7 is a pressure-temperature phase diagram for methane.

During the peak, energy recovery mode as shown in FIG. 6F, the outer ECL of the integrated system 600 stops compressing and liquefying natural gas. Instead, it draws LNG 612k from the LNG storage vessel 692, which provides cooling for the outer ECL. Natural gas as a spent refrigerant is not regenerated during peak hours. Instead, it is supplied as a fuel 612h to a gas turbine 686 to generate power 698b supplied to the energy grid 694 during peak hours. The effluent 688 of the gas turbine 686 enters the coal based power plant 680, providing combined-cycle efficiencies for simple cycle cost. It also provides means to capture the $CO_2$ of the gas turbine effluent. This peak, energy recovery mode reduces the parasitic load of the CCC process and supplies additional energy to the energy grid 694 during peak hours.

Figure 8:
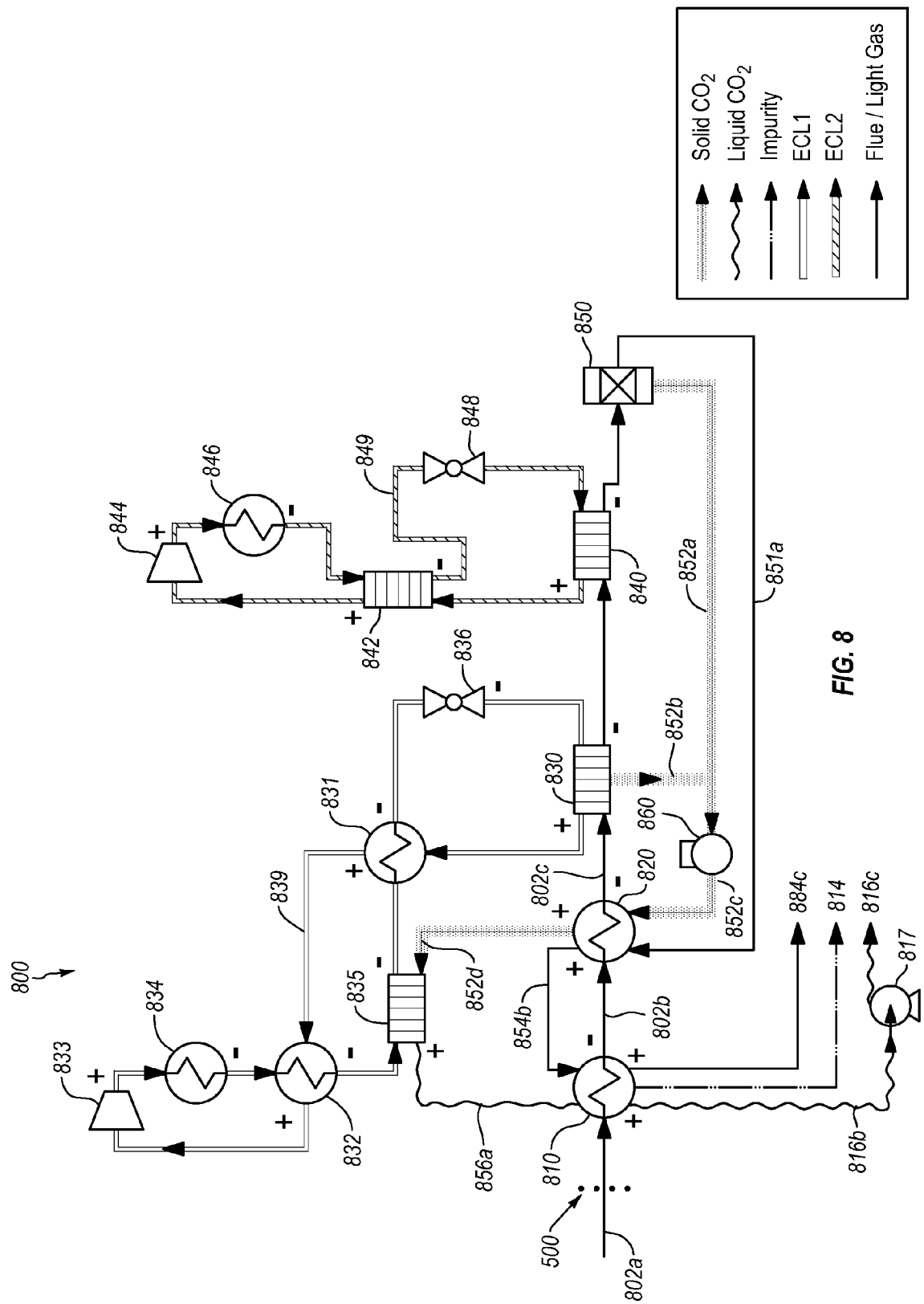
FIG. 8 is a flow diagram of a system for cryogenically capturing carbon dioxide in a flue gas and separating it from light gases and pollutants, the system having two ECLs, two DHEs and two self-recuperative heat exchangers (SRHEs)

The natural gas refrigeration replaces the main refrigeration of the outer ECL in system 600, wherein the same liquefied natural gas refrigerant provides cooling during both peak and off-peak demands. Alternatively, it is possible to run the LNG refrigerant in conduits parallel to the main refrigerant loop. FIG. 8 illustrates an example of the configuration of such a system 800. This system has a first external cooling loop (ECL) 839 and a second ECL 849, which stage the desublimation cooling using DHEs 830 and 840. The system 800 differs from the systems 400 and 600 in that the energy spent for cooling the process stream is recuperated by using the cold, separated process stream to cool the incoming hot, mixed process stream in self-recuperative heat exchangers (SRHEs) 810 and 820. In contrast, systems 400 and 600 use the cold, mixed process stream to cool the refrigerant of the DHE 410.

In this embodiment, hot, mixed flue gas 802a is first cooled in SRHEs 810 and 820, and then cooled in a first DHE 830 and a second DHE 840. The SRHEs provide a mechanism to recuperate the energy spent on desublimating the process stream in the first DHE 830 and the second DHE 840. The separated $CO_2$ in the solid stream first cools the mixed process stream in the SRHE 820. Then it enters a melting heat exchanger (MHE) 835 to cool a condensed refrigerant of the first ECL 839. After melting in the MHE 835, $CO_2$ forms a liquid stream 856a, which then cools the hot, mixed process stream in the SRHE 810. Finally, $CO_2$ liquid stream 816b is pressurized by a pressurizer 817 and sequestered.

The first and second DHEs are configured to provide staged cooling to the mixed process stream, causing $CO_2$ to desublimate and form solids, which are separated from light gas by a solid separator 850, here illustrated as separate from the DHE 840 for clarity. In practice, a solid separation mechanism can also be built into a DHE as in DHE 830. In one embodiment, the separated solid $CO_2$ is pressurized by a solid compressor 860 and then be returned to the SRHEs 820 and 810 to cool the incoming mixed process stream 802a and 802b. Similarly the cold separated light gas streams 851a and 854b can be used in the SRHEs 820 and 810 to cool the incoming hot, mix process stream.

The first ECL 839 and second ECL 830 provide cooling to the first DHE 830 and the second ECL 849, respectively. Their main components and working principles are similar to those in the ECL of system 400, including compressors 442, 823, 844, heat-rejection heat exchangers (HRHEs) 446, 831, 832, 834, 842, 846, and expansion valves 448, 826, 848. Additionally, the first ECL has a melting heat exchanger (MHE) 835 that cools the refrigerant for the first ECL 839 by melting the solid $CO_2$ stream 852d to form a liquid stream 856a.

Figure 9:
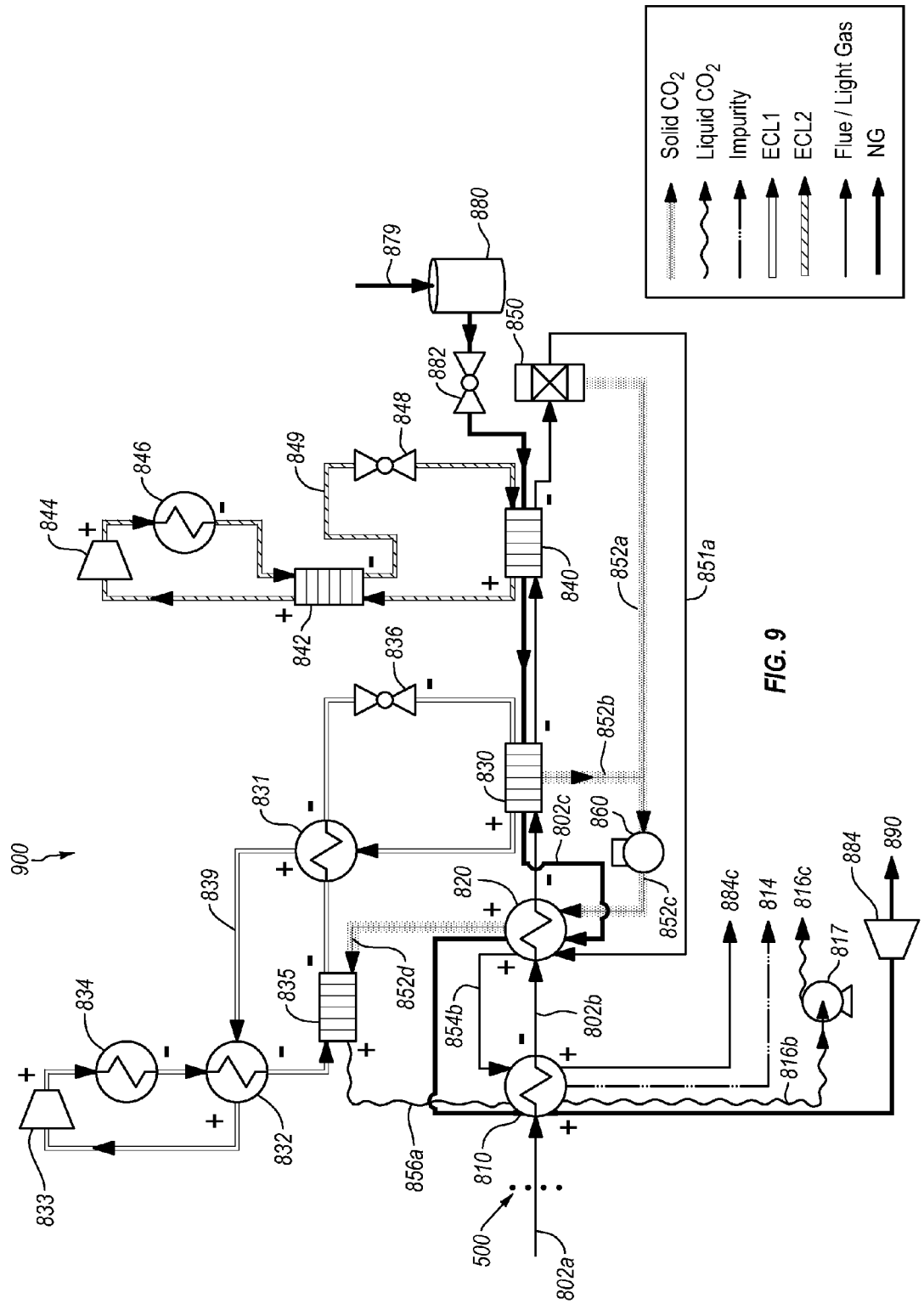
FIG. 9 is a flow diagram of a system for storing energy and capturing carbon dioxide in a flue gas, the system integrating the cryogenic carbon capture system of FIG. 8.

Turning now to FIG. 9, an LNG refrigeration mechanism can be added to the CCC system 800 to store energy by switching the cooling load from the ECLs 839 and 849 to the LNG refrigerant during peak demand, eliminating the parasitic energy consumption load of the CCC process. FIG. 9. illustrates a system 900 as an embodiment of the invention, wherein the LNG refrigerant provides cooling to multiple heat exchangers (840, 830, 831, 832, and 834) in the first ECL 839 in the second ECL 849, with possible exception of the melting heat exchanger 835. In system 900, natural gas is liquefied using off-peak energy, and stored in an LNG storage vessel 880 for later use during peak demand as the refrigerant for the CCC process. This provides for the mechanism to shift the energy consumption for peak-demand CCC from peak demand to off-peak demand, storing off-peak energy and saving peak energy. The LNG provides cooling in parallel to or instead of the ECLs 839 and 849 during peak demand, and it boils and reverts to natural gas as a spent refrigerant, which spent fed to a gas turbine 884 generate electricity during peak demand. The effluent 890 of the gas turbine 884 can be processed in the same manner as the flue gas 802a.

One advantage of the system of the present invention is that it can be installed either as a bolt-on retrofit technology or as an integrated technology. The bolt-on option makes this technology highly attractive for existing power generating facilities. In this configuration, minimal changes to the existing facility are required. The process gas is intercepted prior to the stack and flows through this process without modification of upstream systems. The only major requirement is that enough footprint is available for the new equipment (compressors and turbines).

B. System Equipment

The following discussion of system equipment that may be used to implement the invention.

1. Refrigerant

In a system as an embodiment of the invention, NG is adopted as a refrigerant for the DHE during peak demand to cryogenically capture $CO_2$. Some amount of LNG inevitably escapes during storage, but LNG technologies have reduced this to a very small amount, even shipboard. The only significant remaining loss is the inefficiency associated with using natural gas rather than a more optimized refrigerant for CCC. Natural gas can be used efficiently as refrigerant in this process. However, it will require both the high- and low-temperature end of the cryogenic process to operate at higher pressures than the more typical refrigerants proposed for CCC such as ethane. Methane is also above its critical point at room temperature, meaning that the compression step in the cycle cannot produce a liquid product, as explained in the description of system 600 above. Existing commercial LNG processes effectively address this issue, and integration of LNG process with the flue gas stream provides further opportunity for improvement.

In addition to cooling $CO_2$ using LNG as a refrigerant, the liquefaction of NG also requires a refrigerant, because NG cannot be liquefied by compression at room temperature as discussed above. In one embodiment of the invention, the liquefaction process uses propane, ethylene, and methane in a cascade to cool and liquefy natural gas. In another embodiment, a multicomponent mixture of hydrocarbons (methane-ethane-propane-butane-pentane) and nitrogen can be used as the coolant to liquefy natural gas. Other choice and combination of refrigerants established in the art may also be used for the liquefaction of methane.

2. Compressor

Gas compression represents by far the largest energy-consuming step and capital expense in the process, which includes compressing a refrigerant for liquefying the natural gas. It also includes compression of the natural gas to optimize the temperature profile of the LNG as a refrigerant that cools the process stream. In practice, there are significant issues involved in compressing gases that contain some sour elements, in particular $SO_2$. In the implementation that NG is compressed, it would be advantageous to remove impurities from methane.

3. Upstream Heat Exchanger (UHE)

The process gas passes through a multi-stream, multi-stage UHE similar to the system 400 shown in FIG. 4, where it cools as it exchanges heat with the $CO_2$ and light gas or liquid streams near the end of the process, warming these streams back to near room temperature (approximately 15-20° C.). This multi-section heat exchanger first cools the gas to near 0° C., reducing water concentration in the process gas to about 0.7%.

Approximately 10% of the initial process gas is water, and slightly over 90% of this is recovered from a clean process gas as usable water in this section of the heat exchanger, potentially saving overall water usage on the site. To put this in perspective, on a mass basis, the amount of water recovered can approach the amount of fuel fired, which is a substantial flow. A raw process gas will produce a water stream that will include acid components that will need further treating and the concentration of which will depend on $SO_x$ and $NO_x$ contents and the extent to which they react to form acids, except in unusual conditions, the water content of this flow will so greatly exceed the acid content that the latter will present only routine concern.

4. Self-Recuperative Heat Exchanger (SRHE)

Before the desublimation of $CO_2$, self-recuperative heat exchangers (SRHE) such as the SRHE 810 and 802 of system 800 may be used to further cool the incoming mixed process stream, which reduces the process gas temperature to about −51° C. In this section, the residual water will desublimate on the heat exchanger surfaces if it is not removed prior to its introduction in the heat exchanger and must be periodically removed using techniques discussed above. The water concentration at this point should be about 35 ppm. Pollutants are potentially removed in this section as well. If they form equilibrium products, $NO_x$, $SO_x$, Hg, HCl and similar compounds are essentially quantitatively removed in this section of the heat exchanger (less than 1 ppb of each left in the gas stream), creating a liquid and solid stream with high corrosion potential and significant need for treatment. However, having these all in one relatively concentrated stream places the pollutant cleanup conveniently in one place. Furthermore, some of them may be in forms that are useful as marketable byproducts.

Impurities such as metals and acids can be removed by condensing the impurities at a desired temperature and pressure prior to condensing the carbon dioxide and removing it from the process gas. In many cases, pollutants can be removed with far greater efficiency than conventional systems. Specifically, $SO_x$, HCl, $NO_2$, and Hg removal efficiencies approach 100% with the proposed process without any additional capital and only minor operating expenditures. For example, the heat exchanger can include a condenser separator for removing the impurities from the system. Removing the condensed impurities from the system prevents the impurities from being transported downstream and mixed with the condensed carbon dioxide, which would then require separating the impurities from the carbon dioxide in a separate process (e.g., distillation), which significantly adds to the cost of the system.

All of the foregoing impurities mentioned condense at the pressures and temperatures above those of the $CO_2$ removal. Condensing the impurities and removing them from the system at a temperature the $CO_2$ frost point—the point at which $CO_2$ begins to condense—the concentrations of the impurities remaining in the gas phase can be reduced to a few parts per million (depending on pressure and moisture content). In one embodiment, the concentration of the impurities in the purified condensed gas stream (which includes the carbon dioxide) is less than 100 ppm, more preferably less than 10 ppm, and most preferably less than 1 ppm. Consequently, the purity of the carbon dioxide stream can have purity within the foregoing ranges, without the need to perform distillation. The impurities can be removed from the process as liquids or solids, most of which have commercial value.

5. Desublimating Heat Exchanger (DHE)

The last process gas cooling stages reduce the process gas temperature as low as possible using a DHE (e.g., 650), which is about −120° C. to −165° C. with some variation depending on overall target removal efficiency.

The desublimating heat exchangers used here could be one of several designs previously described by the inventors including heat exchangers that use a fluid bed, bubbler, or a spray tower designs. In one or more implementations, the system is an efficient, steady-state system that does not require batch-wise operations.

6. Solid Separator

During cooling in the SRHE and DHE, particles formed in suspension are separated from the light gases or liquids. Recent laboratory experiments provide an indication of the particle size distributions formed during cooling of simulated and real process gases. In situ measurements of particle size at the exit of laboratory-scale heat exchangers indicate that the particle sizes are approximately 600-750 microns.

The following means are examples of means for separating a condensed $CO_2$ component from the light-gas component. For example, the mechanical mechanism for removing solid $CO_2$ can be a mechanical scraper, piston, plunger or other device that scrapes the walls of a cylinder, drum or other surface. The mechanical mechanism can be a screw mechanism that scrapes the walls of a tube and/or moves the solid material in a desired direction. In another embodiment, the mechanical system can be a piston or similar plunger that scrapes the walls of a cylinder of similar shaped surface. In another embodiment, the mechanical system can scrape the outer walls of a surface on which desublimation occurs. In another embodiment, the mechanical mechanism can be a bag filter or a wire mesh that collects solid $CO_2$ and is then intermittently shaken by a drive motor. In an alternative embodiment, the solid $CO_2$ can be filtered using a cyclone separator that separates the solid $CO_2$ from the light-gas component according to weight. Bag filters, the mechanisms for shaking bag filters, and cyclone separators are known in the art.

Condensed-phase $CO_2$ is sufficiently soft that there is little risk of mechanical binding or wear. Primary disadvantage of the mechanical means above is the added complexity of moving parts operating at low temperatures.

An alternative means of $CO_2$ removal utilizes a vertical- or horizontal-tube fluid bed heat exchanger, which has the advantage of both increasing heat flux relative to a pure-gas system and providing much larger surface area for desublimation in the form of the fluid particles. In this design, process gas enters the bed-portion of the fluid bed while a refrigerant (e.g., cooler process gas or a closed-loop refrigerant) passes through the inside of the tubes of the heat exchanger.

In one embodiment, the solid $CO_2$ component is condensed on particles of solid carbon dioxide. The particles of $CO_2$ provide a surface for the condensed $CO_2$ component to collect on. In one embodiment the particles can form a filter through which the light-gas stream passes.

A recently developed $CO_2$ removal means involves collecting $CO_2$ in contacting fluids that suppress its melting point and subsequently separating the $CO_2$ from the fluid or fluid mixtures. The separation can be significantly aided by the considerable dependence of liquid $CO_2$ density with pressure and temperature. In many cases the $CO_2$-fluid system forms two or more liquid phases. In this configuration, $CO_2$ will condense as a liquid in the mixture at cryogenic temperatures, the liquid will be pressurized, and the high-pressure $CO_2$ will be separated from the liquid at high pressure and possibly a different temperature, typically separated at the lowest temperature in which both components form a liquid. Fluids with particular potential for such use include, but are not limited to, methylcyclopentane, methylcyclohexane, and liquids with similar or lower vapor pressures and similar or lower viscosities at the lowest $CO_2$ separating temperatures.

7. Solids Compressor

A solids pressurization step increases the solids pressure to at least 7 bars (or at least the $CO_2$ triple point pressure) and preferably to 70 bars after solids separation from the light gas or liquid. This both expels trapped gases in the solids stream and allows the $CO_2$ to melt into a liquid phase upon heating rather than re-sublimate into vapor. Solid and liquid compression is far less energy intensive, especially over these pressure ratios, than is gas compression. Solids compression and transport techniques include straight- or tapered-bore auger systems, progressive cavity pumps, one or several compression rams in series, and similar solids handling devices. $CO_2$ is malleable and soft, making it relatively easy to compress and expel gases and to extrude through dies or tubes.

8. Recuperative Heat Exchangers

In some embodiments of the invention, such as systems 400 and 600, after $CO_2$ separation, the light gas or liquid stream passes through the recuperative heat exchanger (RHE), returning to near ambient temperature. The solid stream also passes through the RHE, where it melts to form a liquid in the RHE. The RHE unit in system 400 and 600 is illustrated as a single heat exchanger, but in practice it can comprise multiple heat exchangers to stage the cooling and match temperature profiles of the cool and warm streams.

The separated gas and solid streams must remain physically isolated from each other to prevent remixing while being thermally coupled to avoid entropy generation and energy losses associated with heat transfer across large temperature differences. When the solid $CO_2$ melts, it will stop temperature increases in both streams (since they are thermally coupled) until all solid is converted to a liquid. The stream on the opposite side of the heat exchanger must parallel this temperature profile, ideally differing from it by only a few degrees for maximum efficiency of heat transfer.

Those skilled in the art will recognize that the systems described herein show single heat exchangers and separated heat exchangers that in practice may be multiple heat exchangers, staged heat exchangers, or combined heat exchangers to improve efficiency. In general, cold heat exchangers are generally positioned in the same room or location and warmer heat exchangers are placed together in a warmer room. The particular layout of the heat exchangers in the figures is drawn in a way to provide clarity to the process flow, not necessarily the most efficient layout or configuration of components.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for storing electrical or mechanical energy and separating condensable vapors from light gases or liquids, comprising:
    (i) liquefying at least one gaseous refrigerant using electricity or mechanical energy during off-peak demand;
    (ii) storing the liquefied refrigerant in a liquefied refrigerant storage vessel for later use as a refrigerant;
    (iii) generating electricity by burning fuel in a fuel-based boiler, the fuel-based boiler outputting a mixed process stream;
    (iv) using the liquefied refrigerant as the refrigerant in a traditional heat exchanger (THE) or desublimating heat exchanger (DHE) during peak demand of energy to cool the mixed process stream, the mixed process stream comprising at least one condensable vapor and at least one light gas, thereby causing the condensable vapor to condense or desublimate to form a liquid or solid stream;
    (v) separating the liquid or solid stream from the light gas; and
    (vi) burning the refrigerant as a spent refrigerant to generate additional electricity during the peak demand.

2. The method as in claim 1, wherein the gaseous refrigerant comprises natural gas (NG), and the liquefied refrigerant comprises liquefied natural gas (LNG).

3. The method as in claim 2, further comprising, after liquefying the NG, pressurizing the LNG so that the LNG's boiling point is in the range of 0-20° C. below the lowest design desublimation temperature of the condensable vapor.

4. The method as in claim 2, further comprising, after liquefying the natural gas, pressurizing the LNG to 2-6 bars.

5. The method as in claim 1, wherein the at least one condensable vapor comprises $CO_2$, and the at least one light gas, or the liquid or solid stream comprises $N_2$.

6. The method as in claim 1, wherein the spent refrigerant is combusted in a gas turbine to generate the additional electricity during the peak demand.

7. The method as in claim 6, wherein the effluent of the gas turbine passes into the fuel-based boiler.

8. The method as in claim 6, wherein a portion of a turbine inlet stream comprises $CO_2$-laden boiler flue gas output from the fuel-based boiler, thereby increasing $CO_2$ content of a turbine outlet stream of the gas turbine as compared to the $CO_2$ content of the turbine outlet stream when air alone is used as the turbine inlet stream for the gas turbine.

9. The method as in claim 1, wherein the step of cooling the mixed process stream by transferring heat to the liquefied refrigerant occurs during both peak and off-peak demands.

10. The method as in claim 9, wherein the gaseous refrigerant comprises natural gas (NG), and the liquefied refrigerant comprises liquefied natural gas (LNG), and
    the method further comprises recycling spent but not combusted refrigerant by liquefying and returning a portion of the NG that is spent but not combusted natural gas to the LNG storage vessel during off-peak demand.

11. The method as in claim 1, wherein the step of cooling the mixed process stream by transferring heat to the liquefied refrigerant occurs during peak demand, and the method further comprising cooling the mixed process stream using a refrigerant other than liquid natural gas (LNG) during off-peak demand.

12. The method as in claim 1, further comprising, before liquefying the refrigerant, cooling the refrigerant in a recuperative heat exchanger (RHE).

13. The method as in claim 1, further comprising, before liquefying the refrigerant, cooling the refrigerant in a recuperative heat exchanger (RHE) by transferring heat from the refrigerant to the separated light gas.

14. The method as in claim 1, further comprising, prior to cooling the mixed process stream in the DHE, cooling the mixed process stream in a self-recuperative heat exchanger (SRHE) by warming the separated condensable vapor.

15. The method as in claim 1, further comprising, prior to cooling the mixed process stream in the DHE, cooling the mixed process stream in a self-recuperative heat exchanger (SRHE) by warming the separated light gas.

16. A system for storing energy and separating condensable vapors from light gases or liquids, comprising:
   (i) a gaseous refrigerant liquefaction apparatus configured to use electricity or shaft work during off-peak demand to produce liquefied natural gas (LNG);
   (ii) a liquefied refrigerant storage vessel configured to store the LNG for later use as a refrigerant;
   (iii) at least one traditional heat exchanger (THE) or desublimating heat exchanger (DHE) comprising: (a) an inlet for a mixed process stream, the mixed process stream being output from a fuel-based boiler configured to generate electricity, the mixed process stream comprising at least one condensable vapor and at least one light gas or liquid, (b) the refrigerant comprising the liquefied refrigerant from the liquefied refrigerant storage vessel, supplied during peak demand, and (c) a heat exchange area configured to allow heat to transfer from the mixed process stream to the refrigerant, thereby causing the condensable vapor in the mixed process stream to desublimate;
   (iv) a solid separator configured to separate the desublimated condensable vapor as a solid stream from the light gas or liquid; and
   (v) a natural gas (NG) power generator configured to burn at least a portion of the refrigerant downstream from the THE or DHE as spent refrigerant to generate additional electricity during the peak demand.

17. A system as in claim 16, wherein the natural gas power generator includes a gas turbine.

18. A system as in claim 16, wherein the system comprises at least two DHEs.

* * * * *